(12) United States Patent
Wakui

(10) Patent No.: US 7,013,200 B2
(45) Date of Patent: Mar. 14, 2006

(54) MOVABLE ROBOT

(75) Inventor: Yoshiaki Wakui, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 281 days.

(21) Appl. No.: 10/391,644

(22) Filed: Mar. 20, 2003

(65) Prior Publication Data

US 2003/0216835 A1    Nov. 20, 2003

(30) Foreign Application Priority Data

| May 17, 2002 | (JP) | ............................. 2002-142694 |
| Jan. 29, 2003 | (JP) | ............................. 2003-020030 |

(51) Int. Cl.
*G06F 19/00* (2006.01)

(52) U.S. Cl. ................. 700/245; 700/246; 318/568.12; 180/7.1

(58) Field of Classification Search ........ 700/245–246, 700/250, 258, 259; 318/566, 568.11, 489, 318/139, 580, 587, 568.12; 701/23, 41; 180/7.1; 16/18–20

See application file for complete search history.

(56) References Cited

U.S. PATENT DOCUMENTS

| 4,815,008 A | * | 3/1989 | Kadonoff et al. ............. 701/23 |
| 5,374,879 A | * | 12/1994 | Pin et al. ...................... 318/139 |
| 6,430,471 B1 | * | 8/2002 | Kintou et al. ................ 700/245 |
| 6,453,212 B1 | * | 9/2002 | Asama et al. ................ 700/245 |
| 6,810,976 B1 | * | 11/2004 | Rohrs ........................... 180/22 |
| 2003/0196840 A1 | * | 10/2003 | Rohrs ........................... 180/22 |
| 2004/0182614 A1 | * | 9/2004 | Wakui ......................... 180/7.1 |

FOREIGN PATENT DOCUMENTS

| JP | 09-254838 | 9/1997 |
| JP | 2000-218578 | 8/2000 |
| JP | 2001-322079 | 11/2001 |

OTHER PUBLICATIONS

Wannasuphoprasit et al., Cobot control, 1997, IEEE, pp. 3571-3576.*
Okada et al., MOGRER: A vehicle study and realization for in-pipe inspection tasks, 1987, IEEE, pp. 573-582.*
Moore et al., Design of a 3R Cobot using continuously vairable transmissions, 1997, Internet, pp. 1-5.*
Borenstein et al., Motion control analysis of a mobile robot, 1985, Internet, pp. 1-17.*

* cited by examiner

*Primary Examiner*—Thomas G. Black
*Assistant Examiner*—McDieunel Marc
(74) *Attorney, Agent, or Firm*—Louis Woo

(57) ABSTRACT

A movable robot includes a main body unit and at least three wheel units. The wheel units are connected with the main body unit. The wheel units at least partially project from the main body unit. The wheel units have contact portions for contact with a floor surface. Rotation drive devices operate for rotating the wheel units independently of each other. The main body unit is moved along the floor surface as the wheel units are rotated by the rotation drive devices. Lines projected onto the floor surface and originating from axes of rotation of the wheel units are spaced at substantially equal angular intervals.

8 Claims, 14 Drawing Sheets

MOVABLE ROBOT

BACKGROUND OF THE INVENTION

1. Field of the Invention

This invention generally relates to a movable robot of, for example, a self-moving type. This invention specifically relates to a wheeled robot having three rotation axes or axles.

2. Description of the Related Art

Japanese patent application publication number P2001-322079A discloses a humanoid robot or a bipedalism robot having a body equipped with various sensors. The robot body is divided into portions connected by joints which can be driven by actuators. The sensors include gyro sensors and acceleration sensors mounted on the robot body, and encoders located near the joint actuators. The gyro sensors, the acceleration sensors, and the encoders compose a body-posture sensing arrangement. An action/posture management section in the robot operates the joint actuators in response to the output signals of the gyro sensors, the acceleration sensors, and the encoders to properly control the posture of the robot body.

Japanese patent application publication number P2000-218578A discloses a globe-shaped movable robot which has a spherical shell and a main unit disposed in the spherical shell. The main unit includes a first wheel, a second wheel, a first motor for driving the first wheel, and a second motor for driving the second wheel. The first and second motors can be operated by a motor controller in the main unit. The first and second wheels are axially spaced from and parallel to each other. The outer circumferential surfaces of the first and second wheels are in contact with the inner surface of the spherical shell. In the case where the motor controller operates the first and second motors to rotate the first and second wheels at equal speeds in a same direction, the spherical shell moves forward while rotating in a direction opposite to the direction of rotation of the first and second wheels. In the case where the motor controller operates the first and second motors to rotate the first and second wheels at equal speeds in opposite directions respectively, the spherical shell spins about a vertical axis while the center of the shell remains substantially at a same point. In the case where the motor controller operates the first and second motors to rotate the first and second wheels at different speeds respectively in a same direction, the spherical shell turns along a curved path.

Japanese patent application publication number 9-254838/1997 discloses a globe-shaped movable body which includes a spherical shell and a square base disposed in the shell. The square base extends horizontally. Three driving wheels and a caster (an idler wheel) are provided on the four corners of the square base, respectively. The driving wheels and the caster are in contact with the inner surface of the spherical shell. The driving wheels can be actuated by motors, respectively. As first one of the driving wheels is rotated by the related motor, the spherical shell moves in a pitch direction. As second one of the driving wheels is rotated by the related motor, the spherical shell moves in a roll direction. As third one of the driving wheels is rotated by the related motor, the spherical shell moves in a yaw direction. When two of the driving wheels are simultaneously actuated, the spherical shell makes a composite movement.

The bipedalism robot in Japanese application P2001-322079A has an extremely complicated structure and a very large number of parts. The gyro sensors, the acceleration sensors, and the encoders in the bipedalism robot are expensive and large in size. Therefore, the bipedalism robot tends to be high in cost and great in size. Accordingly, the bipedalism robot is unsuited for home use. In the bipedalism robot, the body-posture control is based on a very complicated algorithm. Generally, such an algorithm necessitates the use of a special computer which can process data at a high rate. Since the size of a computer program for such an algorithm is large, a memory related to the computer needs to be huge in capacity. The special computer and the huge-capacity memory are expensive. The bipedalism robot has a considerable chance of falling down when meeting an obstacle.

The globe-shaped movable robot in Japanese application P2000-218578A and the globe-shaped movable body in Japanese application 9-254838 tend to be unable to maintain their correct postures and are liable to spontaneously move down when they are on a sloping floor. Since the spherical shells of the movable robot and body remain in contact with floors, the outer surfaces of the shells tend to become dirty and flawed as a result of long-term use. The movable robot and body can not make complicated movements and quick movements. Accordingly, the performances of the movable robot and body are insufficient for home use.

SUMMARY OF THE INVENTION

It is a first object of this invention to provide a movable robot having a relatively simple structure.

It is a second object of this invention to provide a movable robot composed of a relatively small number of parts.

It is a third object of this invention to provide an inexpensive movable robot.

It is a fourth object of this invention to provide a movable-robot suited for home use.

It is a fifth object of this invention to provide a movable robot which dispenses with a special computer.

It is a sixth object of this invention to provide a movable robot which requires only an inexpensive memory.

It is a seventh object of this invention to provide a movable robot which hardly falls down.

It is an eighth object of this invention to provide a movable robot having outer surfaces which hardly become dirty and flawed.

A first aspect of this invention provides a movable robot comprising a main body unit; at least three wheel units connected with the main body unit and at least partially projecting from the main body unit, the wheel units having contact portions for contact with a floor surface; rotation drive devices for rotating the wheel units independently of each other; and means for moving the main body unit along the floor surface as the wheel units are rotated by the rotation drive devices; wherein lines projected onto the floor surface and originating from axes of rotation of the wheel units are spaced at substantially equal angular intervals.

A second aspect of this invention is based on the first aspect thereof, and provides a movable robot wherein at most two of the axes of rotation of the wheel units are on a common plane.

A third aspect of this invention is based on the first aspect thereof, and provides a movable robot wherein the axes of rotation of the wheel units intersect at a point.

A fourth aspect of this invention is based on the first aspect thereof, and provides a movable robot further comprising axially-movable leg portions connecting the main body unit and the wheel units, and axial-motion drive devices for axially moving the leg portions relative to the main body unit.

A fifth aspect of this invention is based on the first aspect thereof, and provides a movable robot wherein each of the contact portions has a convex surface substantially extending along a part of a sphere.

A sixth aspect of this invention is based on the first aspect thereof, and provides a movable robot further comprising an external condition sensor for detecting a condition of an external with respect to the main body unit; an output device for outputting information to the external with respect to the main body unit; a memory storing a control program for implementing prescribed processing in response to the external condition detected by the external condition sensor; and a controller for deciding contents of information to be outputted from the output device and also contents of control of the rotation drive devices on the basis of the control program and the external condition detected by the external condition sensor, and for controlling the output device and the rotation drive devices in accordance with the decided contents of information to be outputted from the output device and also the decided contents of control of the rotation drive devices.

A seventh aspect of this invention is based on the sixth aspect thereof, and provides a movable robot further comprising axially-movable leg portions connecting the main body unit and the wheel units; axial-motion drive devices for axially moving the leg portions relative to the main body unit; and means provided in the controller for controlling the axial-motion drive devices.

An eighth aspect of this invention is based on the sixth aspect thereof, and provides a movable robot wherein the external condition sensor comprises a first sub sensor for detecting a specified condition of the external with respect to the main body unit, and a second sub sensor for detecting a pressure applied to the main body unit from the external with respect to the main body unit.

A ninth aspect of this invention is based on the sixth aspect thereof, and provides a movable robot further comprising a communication device for implementing radio communications between the controller and an external device.

DETAILED DESCRIPTION OF THE INVENTION

First Embodiment

Figure 1:
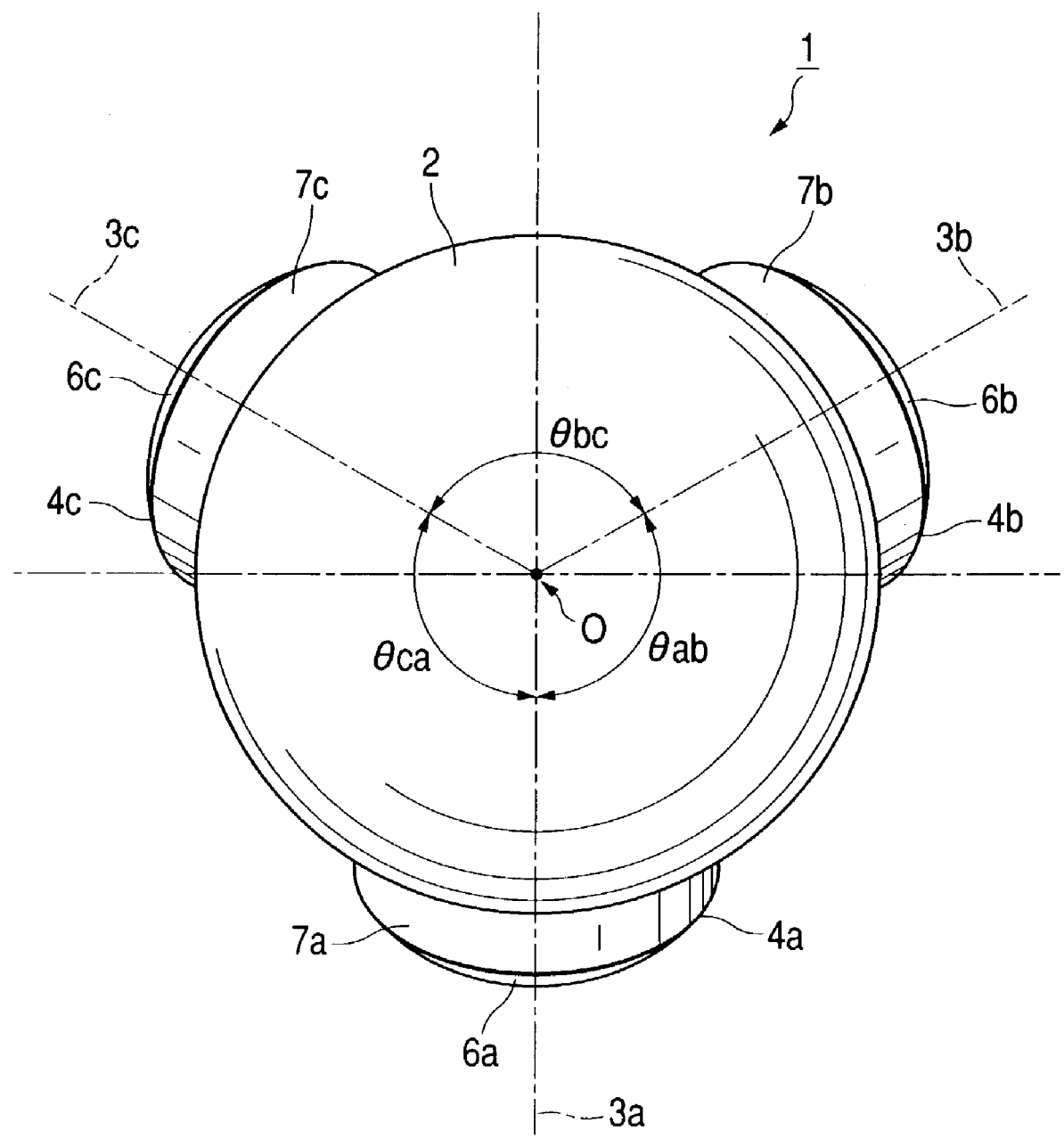
FIG. 1 is a top view of a movable robot according to a first embodiment of this invention.
Figure 2:
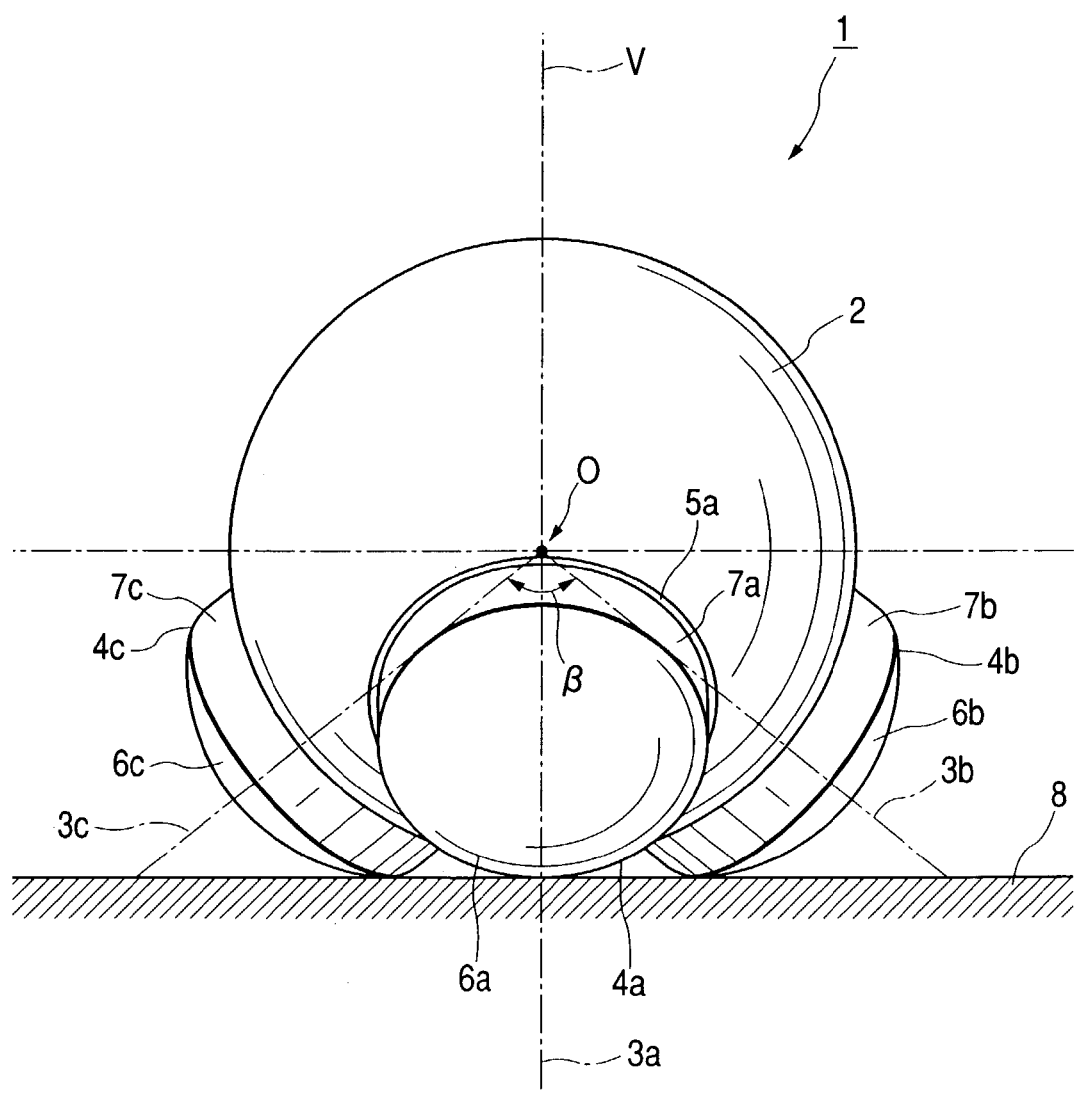
FIG. 2 is a front view of the movable robot in FIG. 1.
Figure 3:
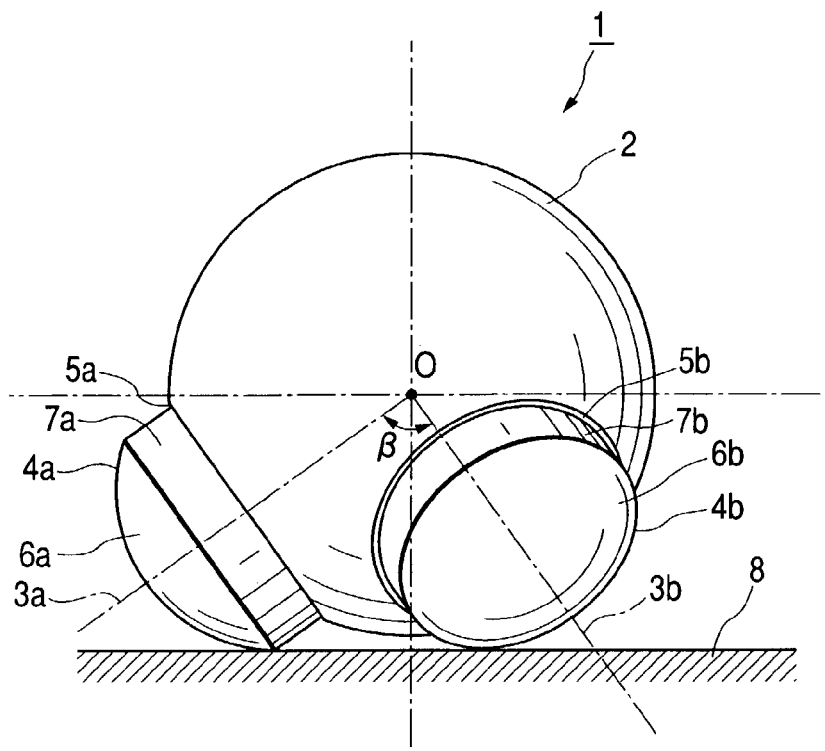
FIG. 3 is a right-hand side view of the movable robot in FIG. 1.

FIGS. 1, 2, and 3 show a movable robot 1 according to a first embodiment of this invention. With reference to FIGS. 1, 2, and 3, the robot 1 includes a main body unit 2 and three wheel units 4a, 4b, and 4c rotatably connected with the main body unit 2. The main unit 2 has an approximately spherical casing or shell. The wheel units 4a, 4b, and 4c are of equal structures.

The casing in the main body unit 2 is formed with openings 5a, 5b, and 5c which correspond to rotation axes respectively. The rotation axes will be mentioned later. The wheel units 4a, 4b, and 4c extend through the openings 5a, 5b, and 5c, respectively. Portions of the wheel units 4a, 4b, and 4c project outward from the openings 5a, 5b, and 5c.

The wheel unit 4a includes a contact portion 6a at its outer end. The contact portion 6a has a convex surface substantially extending along a part of a sphere. The wheel unit 4a also includes a cylindrical portion 7a extending coaxially and inward from the contact portion 6a. Similarly, the wheel units 4b and 4c include contact portions 6b and 6c, and cylindrical portions 7b and 7c. The contact portions 6a, 6b, and 6c are also referred to as the wheel ends 6a, 6b, and 6c. Normally, the wheel ends (contact portions) 6a, 6b, and 6c are in contact with a floor surface 8, thereby supporting the main body unit 2 with respect to the floor surface 8 in a manner such that the main body unit 2 is spaced upward from the floor surface 8.

In the case where the wheel ends 6a, 6b, and 6c and the floor surface 8 are rigid, the contacts between them are of a point type. On the other hand, in the case where the floor surface 8 is formed by a carpet and is hence soft, the contacts are of a surface type.

The central axes of the cylindrical portions 7a, 7b, and 7c coincide with rotation axes 3a, 3b, and 3c, respectively. The rotation axes 3a, 3b, and 3c mean axes about which the wheel units 4a, 4b, and 4c rotate. The rotation axes 3a, 3b, and 3c intersect at the center O of the approximately spherical casing of the main body unit 2. A movement plane is defined as one determined by the points at which the wheel ends 6a, 6b, and 6c contact with the floor surface 8. Provided that the floor surface 8 is rigid, the movement plane coincides with the floor surface 8. As shown in FIG. 1, lines projected onto the movement plane (the floor surface 8) and originating from the rotation axes 3a, 3b, and 3c are spaced at exactly or substantially equal angular intervals. Thus, in FIG. 1, the projectional angle θab between the rotation axes 3a and 3b, the projectional angle θbc between the rotation axes 3b and 3c, and the projectional angle θca between the rotation axes 3c and 3a are exactly or substantially equal to each other.

An example of preferably setting of angles among the rotation axes 3a, 3b, and 3c is as follows. With reference to FIGS. 2 and 3, the true angle between the rotation axes 3a and 3b, the true angle between the rotation axes 3b and 3c, and the true angle between the rotation axes 3c and 3a are equal to a predetermined value "β", for example, 90 degrees. On the other hand, the angles between the lines projected onto the movement plane (the floor surface 8) and originating from the rotation axes 3a, 3b, and 3c are equal to 120 degrees. Two among the rotation axes 3a, 3b, and 3c are on a common plane.

Figure 4:
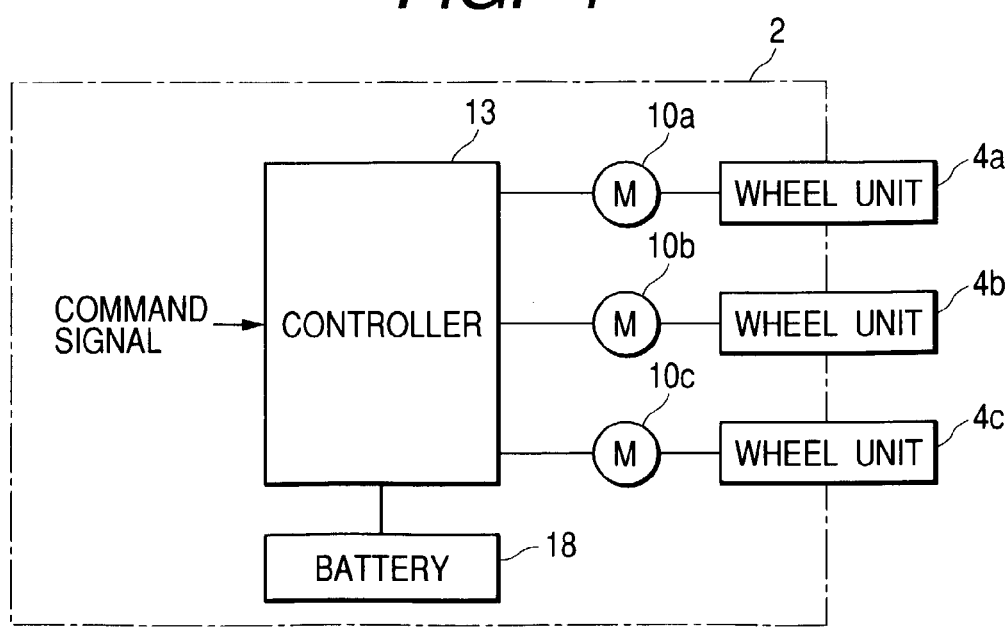
FIG. 4 is a diagram of a control system in the movable robot of FIG. 1.

As shown in FIG. 4, the main body unit 2 contains rotation drive motors 10a, 10b, and 10c, a controller 13, and a battery 18. The wheel units 4a, 4b, and 4c are coupled with the output shafts of the rotation drive motors 10a, 10b, and 10c, respectively. The wheel units 4a, 4b, and 4c can be independently actuated by the rotation drive motors 10a, 10b, and 10c. The wheel units 4a, 4b, and 4c rotate about the rotation axes 3a, 3b, and 3c respectively when being actuated. Preferably, the rotation drive motors 10a, 10b, and 10c include DC motors.

The rotation drive motors 10a, 10b, and 10c are connected via the controller 13 with the battery 18. The controller 13 adjusts power feed from the battery 18 to the rotation drive motors 10a, 10b, and 10c, thereby independently controlling the directions and speeds of rotation of the output shafts of the motors 10a, 10b, and 10c, that is, the directions and speeds of rotation of the wheel units 4a, 4b, and 4c. The controller 13 can respond to a command signal indicating a desired movement of the robot 1. The controller 13 implements the control of the directions and speeds of rotation of the wheel units 4a, 4b, and 4c in response to the command signal so that the robot 1 can actually make the desired movement indicated by the command signal. The command signal can also indicate a request for stop of the robot 1. The controller 13 deactivates the rotation drive motors 10a, 10b, and 10c to stop the robot 1 when the command signal indicates a stop request. The application of the command signal to the controller 13 may be on a radio communication basis or a wireless communication basis. The controller 13 includes a microcomputer or a similar device having a combination of an input/output circuit, a processor, a ROM, and a RAM. The controller 13 operates in accordance with a control program stored in the ROM or the RAM. The control program for the controller 13 is designed to enable the controller 13 to execute operation steps of controlling the rotation drive motors 10a, 10b, and 10c or the wheel units 4a, 4b, and 4c.

The independent control of the directions and speeds of rotation of the wheel units 4a, 4b, and 4c provides various movements of the robot 1 with the aid of the frictional forces between the wheel units and the floor surface 8.

The robot 1 can be operated in one selected among different modes which provide the following five robot movements 1), 2), 3), 4), and 5) respectively:

1) a rotation on its own axis with the robot center remaining at a same point;
2) a straight movement (a forward movement, a backward movement, or a sideward movement);
3) a curved movement;
4) a meandering movement; and
5) a straight or curved movement with a rotation on its own axis.

The robot movements 1), 2), 3), 4), and 5) will be explained below.

Figure 5:
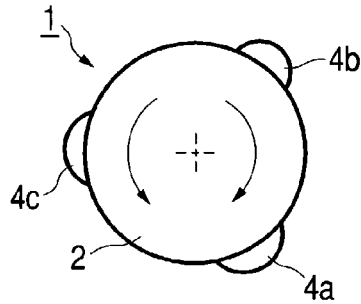
FIG. 5 is a top view of the movable robot in FIG. 1 which is making a rotation on its own axis with a robot center remaining at a same point.
Figure 6:
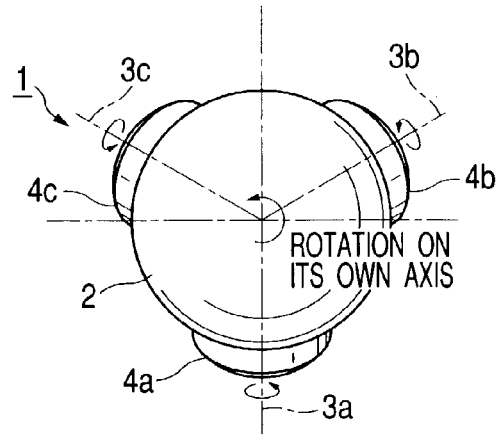
FIG. 6 is a top view of the movable robot in FIG. 1 which is making a rotation on its own axis with the robot center remaining at a same point.

The robot movement 1), that is, the rotation on its own axis with the robot center remaining at a same point, is provided by a robot operation mode 1A) which is the most basic. During operation of the robot 1 in the mode 1A), the wheel units 4a, 4b, and 4c are rotated at equal speeds in equal directions, and the robot 1 rotates on its own axis while the center of the robot 1 remains at a same point. With reference to FIGS. 5 and 6, in the case where the wheel units 4a, 4b, and 4c are rotated clockwise at equal speeds as viewed from outside, the robot 1 rotates counterclockwise on its own axis while the center of the robot 1 remains at a same point as viewed from above. In the case where the wheel units 4a, 4b, and 4c are rotated counterclockwise at equal speeds as viewed from outside, the robot 1 rotates clockwise on its own axis while the center of the robot 1 remains at a same point as viewed from above. The speed of rotation of the robot 1 on its own axis rises and drops in accordance with an increase and a decrease in the speed of rotation of the wheel units 4a, 4b, and 4c, respectively.

The robot movement 2), that is, the straight movement, is provided by a robot operation mode 2A). During operation of the robot 1 in the mode 2A), arbitrary one among the wheel units 4a, 4b, and 4c remains deactivated and stopped while the other wheel units are rotated at equal speeds in opposite directions respectively. During operation of the robot 1 in the mode 2A), the robot 1 moves straight along a line projected onto the floor surface 8 and originating from the rotation axis of the deactivated wheel unit.

In the case where the directions and speeds of rotation of the activated wheel units are set in one of prescribed relations, the robot 1 moves straight in a direction perpendicular to the line projected onto the floor surface 8 and originating from the rotation axis of the deactivated wheel unit.

Figure 7:
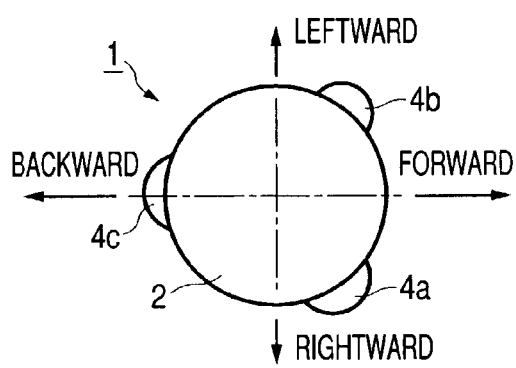
FIG. 7 is a top view of the movable robot in FIG. 1 which is making a straight movement.

With reference to FIG. 7, the wheel unit 4c remains deactivated and stopped while the wheel units 4a and 4b are activated. The forward movement of the robot 1 is defined as a straight movement along a direction from the center of the robot 1 which passes through a robot outer surface point opposite to the deactivated wheel unit (the wheel unit 4c). The backward movement of the robot 1 is defined as a straight movement along a direction from the center of the robot 1 which passes through the center of the deactivated wheel unit (the wheel unit 4c). The leftward movement and the rightward movement of the robot 1, that is, the first sideward movement and the second sideward movement of the robot 1, are defined as straight movements along directions perpendicular to the forward and backward movements.

Figure 8:
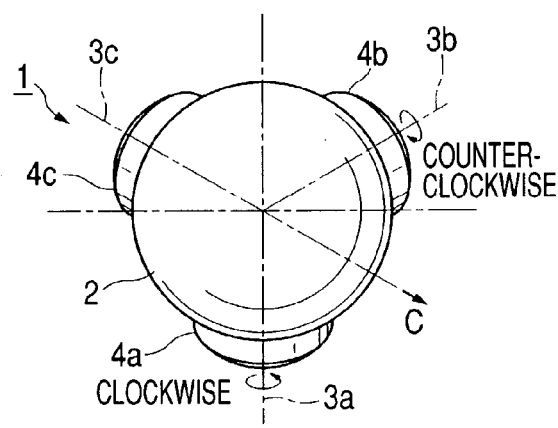
FIG. 8 is a top view of the movable robot in FIG. 1 which is making a forward movement.

The forward movement is as follows. With reference to FIG. 8, in the case where the wheel unit 4c remains deactivated and stopped while the wheel units 4a and 4b are rotated clockwise and counterclockwise respectively at equal speeds, the robot 1 moves straight along a direction C from the center of the robot 1 which passes through a robot outer surface point opposite to the deactivated wheel unit 4c. The direction C is parallel to the line projected onto the floor surface 8 and originating from the rotation axis 3c of the deactivated wheel unit 4c. The speed of the forward movement rises and drops as the speed of rotation of the wheel units 4a and 4b increases and decreases, respectively.

Figure 9:
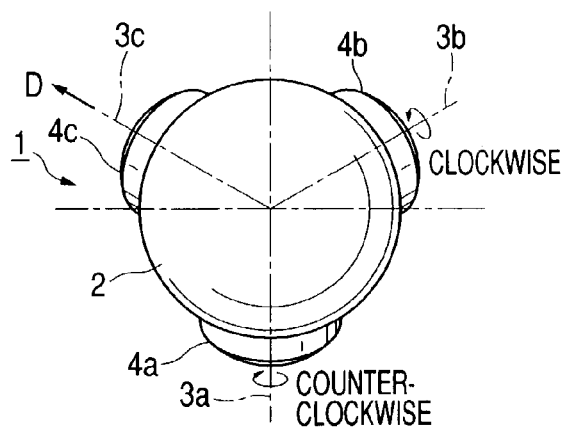
FIG. 9 is a top view of the movable robot in FIG. 1 which is making a backward movement.

The backward movement is as follows. With reference to FIG. 9, in the case where the wheel unit 4c remains deactivated and stopped while the wheel units 4a and 4b are rotated counterclockwise and clockwise respectively at equal speeds, the robot 1 moves straight along a direction D from the center of the robot 1 which passes through the center of the deactivated wheel unit 4c. The direction D is parallel to the line projected onto the floor surface 8 and originating from the rotation axis 3c of the deactivated wheel unit 4c. The speed of the backward movement rises and drops as the speed of rotation of the wheel units 4a and 4b increases and decreases, respectively.

Figure 10:
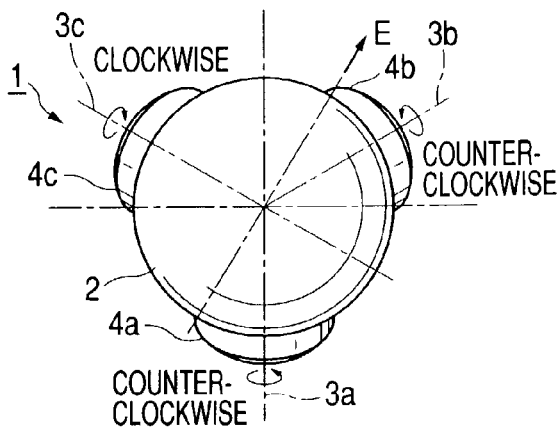
FIG. 10 is a top view of the movable robot in FIG. 1 which is making a leftward movement.

The leftward movement (the first sideward movement) is as follows. With reference to FIGS. 7 and 10, in the case where the wheel units 4a and 4b are rotated clockwise at a constant speed N while the wheel unit 4c is rotated counterclockwise at a speed 2N equal to twice the constant speed N, the robot 1 moves straight along a direction E from the center of the robot 1 which is perpendicular to the direction of the forward movement. The speed of the leftward movement rises and drops as the speeds of rotation of the wheel units 4a, 4b, and 4c increase and decrease, respectively.

Figure 11:
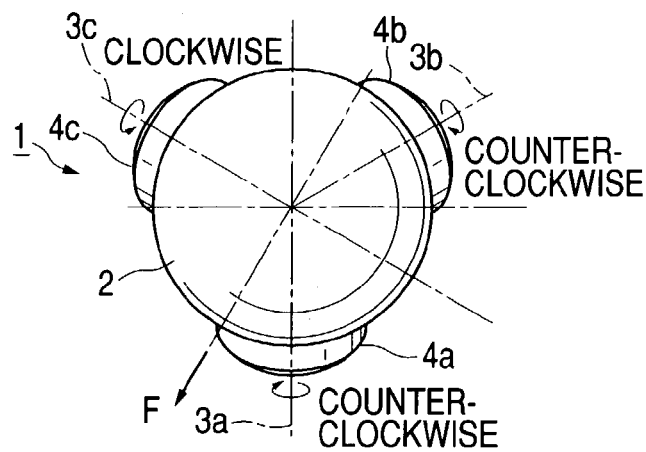
FIG. 11 is a top view of the movable robot in FIG. 1 which is making a rightward movement.

The rightward movement (the second sideward movement) is as follows. With reference to FIGS. 7 and 11, in the case where the wheel units 4a and 4b are rotated counterclockwise at a constant speed N while the wheel unit 4c is rotated clockwise at a speed 2N equal to twice the constant speed N, the robot 1 moves straight along a direction F from the center of the robot 1 which is perpendicular to the direction of the forward movement, and which is opposite to the direction E. The speed of the rightward movement rises and drops as the speeds of rotation of the wheel units 4a, 4b, and 4c increase and decrease, respectively.

Figure 12:
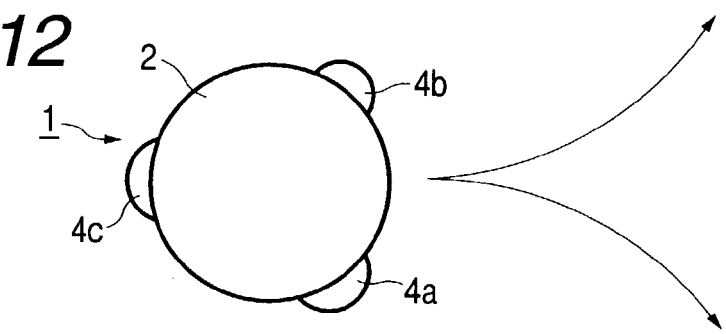
FIG. 12 is a top view of the movable robot in FIG. 1 which is making a curved movement.

The robot movement 3), that is, the curved movement, is provided by a robot operation mode 3A). The curved movement means a movement of the robot 1 along an arc of a circle. During operation of the robot 1 in the mode 3A), arbitrary two among the wheel units 4a, 4b, and 4c are rotated at equal speeds in opposite directions respectively, and the other wheel unit (the special wheel unit) is rotated also. During operation of the robot 1 in the mode 3A), the robot 1 moves along an arc of a circle as shown in FIG. 12. The radius of the arc (the radius of the circle) is changed as the speed of rotation of the special wheel unit is varied. Specifically, the radius of the arc is decreased as the speed of rotation of the special wheel unit is increased. The speed of the curved movement rises and drops as the speed of rotation of the wheel units different from the special wheel unit increases and decreases, respectively. Furthermore, the radius of the arc is changed as the speed of rotation of the wheel units different from the special wheel unit is varied. Specifically, the radius of the arc is increased as the speed of rotation of the wheel units different from the special wheel unit is raised.

The robot movement 3), that is, the curved movement, may be provided by a robot operation mode 3B). During operation of the robot 1 in the mode 3B), arbitrary one among the wheel units 4a, 4b, and 4c remains deactivated and stopped while the other wheel units are rotated at different speeds in opposite directions respectively. During operation of the robot 1 in the mode 3B), the robot 1 moves along an arc of a circle whose center is located in a slower-wheel-unit side. The radius of the arc (the radius of the circle) is changed as the difference in rotational speed between the activated wheel units is varied. Specifically, the radius of the arc is decreased as the speed difference is increased. The speed of the curved movement rises and drops as the speeds of rotation of the activated wheel units increase and decrease, respectively.

Figure 13:
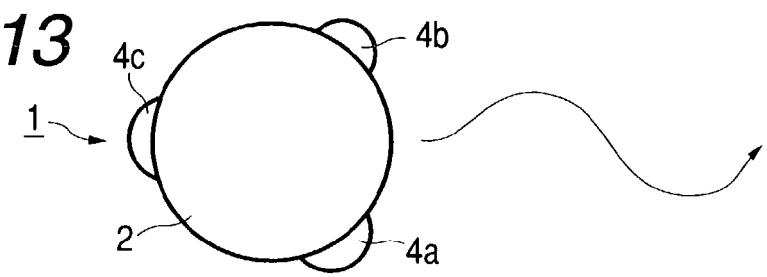
FIG. 13 is a top view of the movable robot in FIG. 1 which is making a meandering movement.

The robot movement 4), that is, the meandering movement, is provided by a robot operation mode 4A). During operation of the robot 1 in the mode 4A), arbitrary two among the wheel units 4a, 4b, and 4c are rotated at equal speeds in opposite directions respectively, and the other wheel unit (the special wheel unit) is rotated while the direction of rotation of the special wheel unit is alternately changed between the normal direction and the reverse direction. During operation of the robot 1 in the mode 4A), the robot 1 meanders while moving roughly along a straight line as shown in FIG. 13.

The robot movement 4), that is, the meandering movement, may be provided by a robot operation mode 4B). During operation of the robot 1 in the mode 4B), arbitrary one among the wheel units 4a, 4b, and 4c remains deactivated and stopped while the other wheel units are rotated at different speeds in opposite directions respectively and the speeds of rotation of the other wheel units are repetitively alternated or exchanged. During operation of the robot 1 in the mode 4B), the robot 1 meanders.

Figure 14:
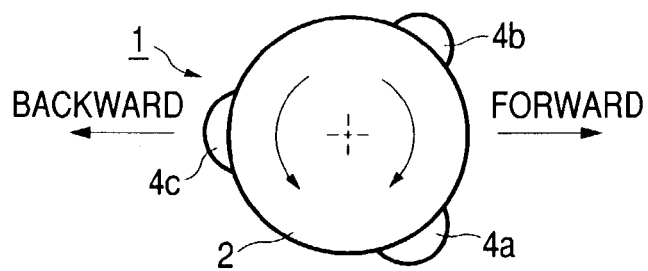
FIG. 14 is a top view of the movable robot in FIG. 1 which is making a straight or curved movement with a rotation on its own axis.

The robot movement 5), that is, the straight or curved movement with a rotation on its own axis, is provided by a robot operation mode 5A). During operation of the robot 1 in the mode 5A), the directions of rotation of the wheel units 4a, 4b, and 4c are periodically and alternately changed between the normal directions and the reverse directions, and the speeds of rotation of the wheel units 4a, 4b, and 4c are periodically varied along sinusoidal waveforms in time domain while given phase differences are provided among the directions and speeds of rotation of the wheel units 4a, 4b, and 4c. During operation of the robot 1 in the mode 5A), the robot 1 moves straight or moves along a curved path while rotating on its own axis as shown in FIG. 14.

Figure 15:
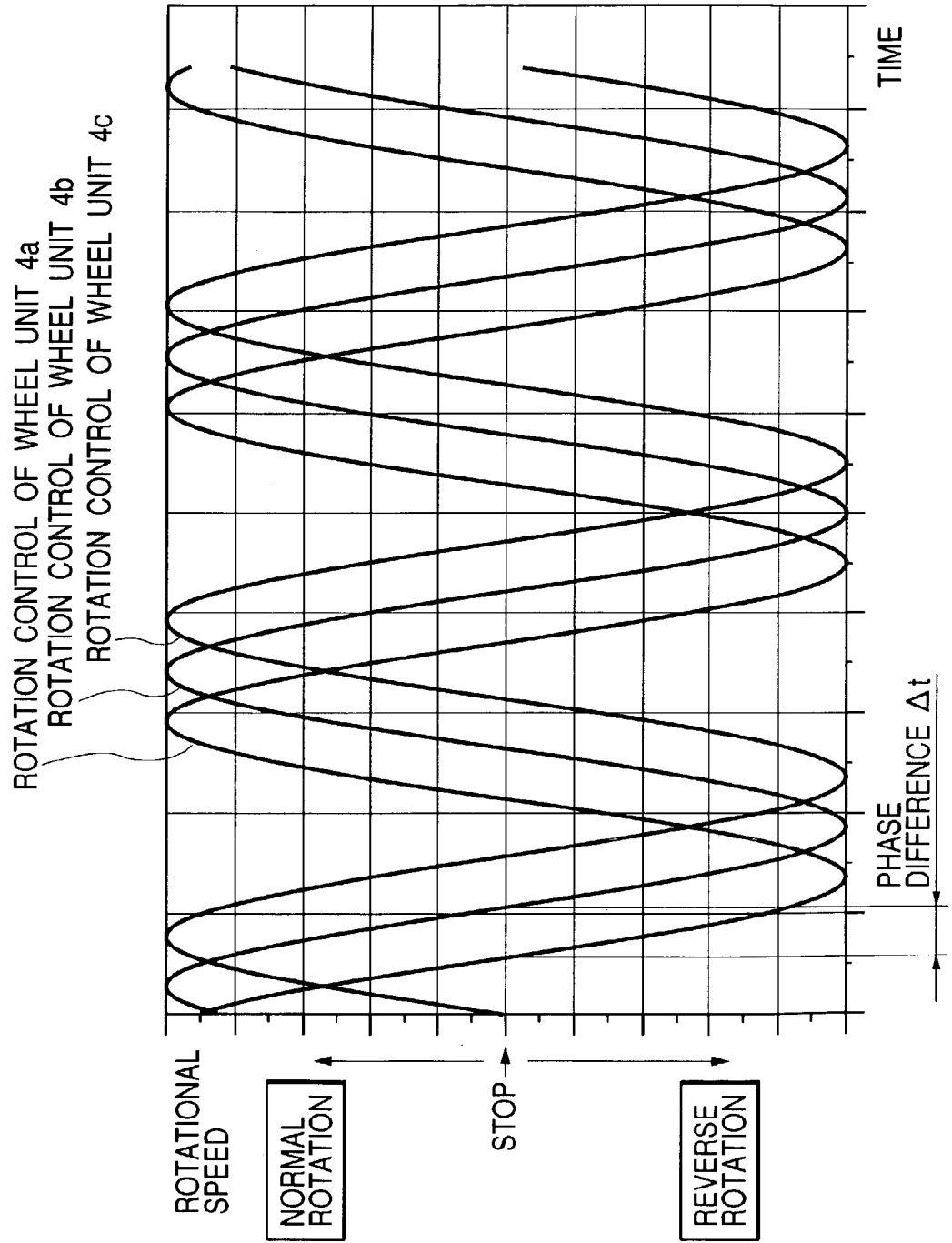
FIG. 15 is a time-domain diagram of the directions and speeds of rotation of wheel units in the movable robot in FIG. 1 which occur while the robot is making a straight or curved movement with a rotation on its own axis.

FIG. 15 shows time-domain variations in the directions and speeds of rotation of the wheel units 4a, 4b, and 4c which occur during the operation of the robot 1 in the mode 5A). In FIG. 15, the abscissa denotes time, and the ordinate denotes wheel-unit speed. The upper half of the drawing corresponds to wheel-unit rotation in the normal direction, whereas the lower half thereof corresponds to that in the reverse direction. As shown in FIG. 15, the wheel units 4a, 4b, and 4c are rotated at speeds varying along sinusoidal waveforms between which given phase differences At are provided. The speed of rotation of the robot 1 on its own axis, the speed of straight movement of the robot 1, and the speed and radius of curved movement of the robot 1 can be controlled by changing the amplitudes, the periods, and the phases of the above-mentioned waveforms. It should be noted that the waveforms may be changed from the sinusoidal type to another type which causes more complicated movements of the robot 1.

Preferably, the contact portions 6a, 6b, and 6c of the wheel units 4a, 4b, and 4c are equal in diameters of cross sections perpendicular to the rotation axes 3a, 3b, and 3c.

The contact portions 6a, 6b, and 6c of the wheel units 4a, 4b, and 4c may be different in diameters of cross sections perpendicular to the rotation axes 3a, 3b, and 3c. In this case, the robot movements 1), 2), 3), 4), and 5) can be made provided that the ratio among the speeds of rotation of the wheel units 4a, 4b, and 4c is set according to the ratio among the diameters of the contact portions (the wheel ends) 6a, 6b, and 6c. Normally, the greatest-diameter portions of the wheel ends 6a, 6b, and 6c contact the floor surface 8. In the case where the ratio among the greatest diameters of the wheel ends 6a, 6b, and 6c is Ma:Mb:Mc, the ratio among the speeds of rotation of the wheel units 4a, 4b, and 4c is set as 1/Ma:1/Mb:1/Mc.

As previously mentioned, the directions and speeds of rotation of the wheel units 4a, 4b, and 4c are independently controlled so that the robot 1 can make various movements. In addition, the robot 1 can quickly move. The robot 1 has performances suited for home use. Two or more different movements of the robot 1 may be combined. Thus, the robot 1 can make entertaining movements. In the case where the wheel units 4a, 4b, and 4c are held stationary or stopped, the robot 1 maintains a same posture. In this case, the robot 1 is prevented from spontaneously moving down even when it is on a sloping floor.

Figure 16:
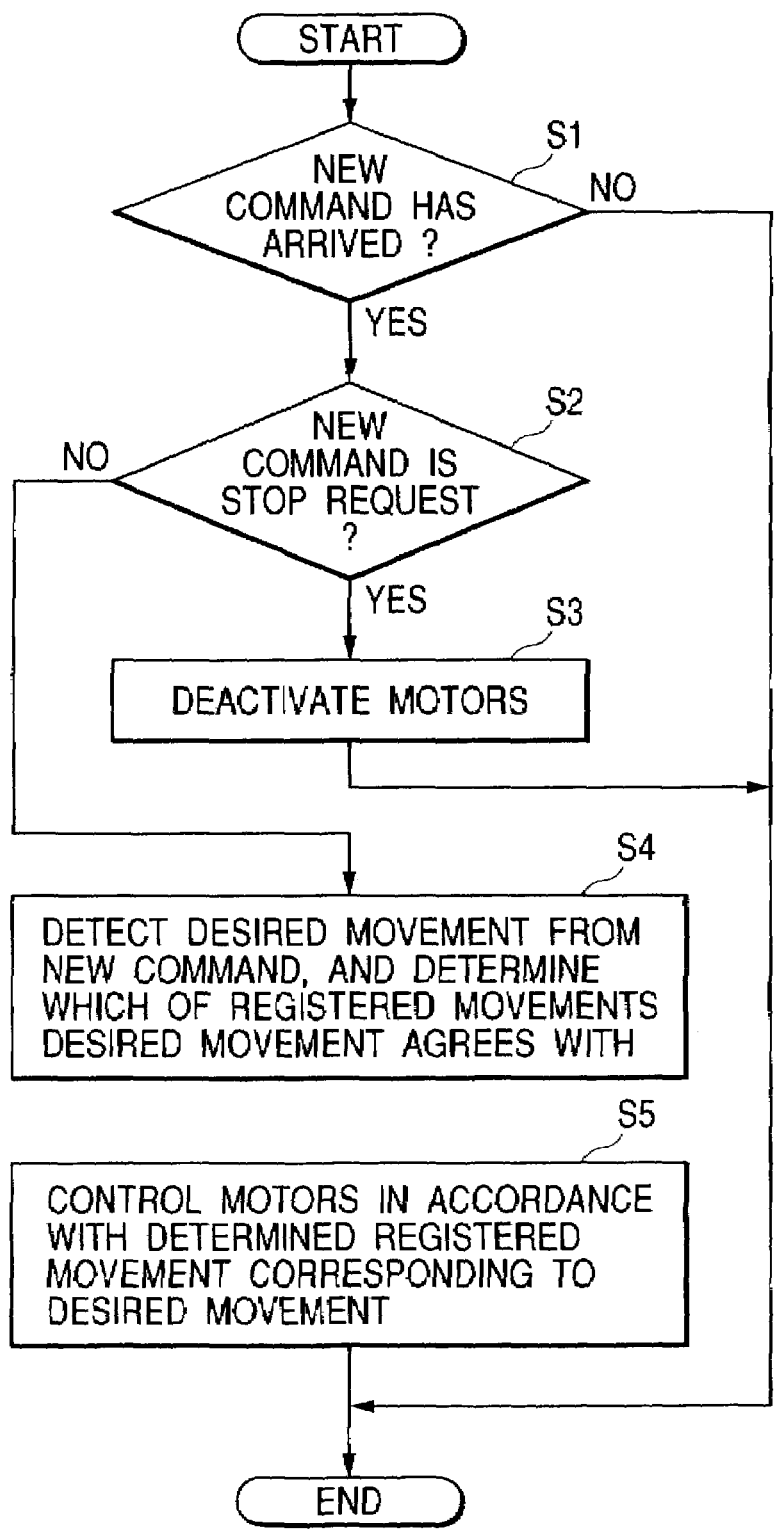
FIG. 16 is a flowchart of a segment of an example of a control program for a controller in FIG. 4.

As previously mentioned, the controller 13 operates in accordance with a control program. FIG. 16 is a flowchart of a segment of an example of the control program. The program segment in FIG. 16 is repetitively executed. As shown in FIG. 16, a first step S1 of the program segment decides whether or not a new command signal has arrived. When a new command signal has arrived, the program advances from the step S1 to a step S2. Otherwise, the program exits from the step S1, and then the current execution cycle of the program segment ends.

The step S2 decides whether or not the new command signal indicates a request for stop of the robot 1. When it is decided that the new command signal indicates a stop request, the program advances from the step S2 to a step S3. Otherwise, the program advances from the step S2 to a step S4.

The step S3 deactivates the rotation drive motors 10a, 10b, and 10c to stop the robot 1. After the step S3, the current execution cycle of the program segment ends.

The step S4 detects the desired robot movement from the command signal. The step S4 accesses previously-stored information in the ROM or the RAM of the controller 13 which represents registered robot movements including the previously-mentioned robot movements 1), 2), 3), 4), and 5). The step S4 collates the desired robot movement with the registered robot movements, and determines which of the registered robot movements the desired robot movement agrees with. The step S4 selects one among the registered robot movements with which the desired robot movement agrees.

A step S5 following the step S4 accesses previously-stored information in the ROM or the RAM of the controller 13 which represents a table of the relation among the registered robot movements and target conditions of the rotation drive motors 10a, 10b, and 10c. The step S5 refers to the table, and thereby determines target conditions of the rotation drive motors 10a, 10b, and 10c which correspond to the registered robot movement selected by the step S4. The step S5 controls the rotation drive motors 10a, 10b, and 10c into the conditions same as the determined target conditions. As a result, the desired robot movement is implemented. After the step S5, the current execution cycle of the program segment ends.

Second Embodiment

Figure 17:
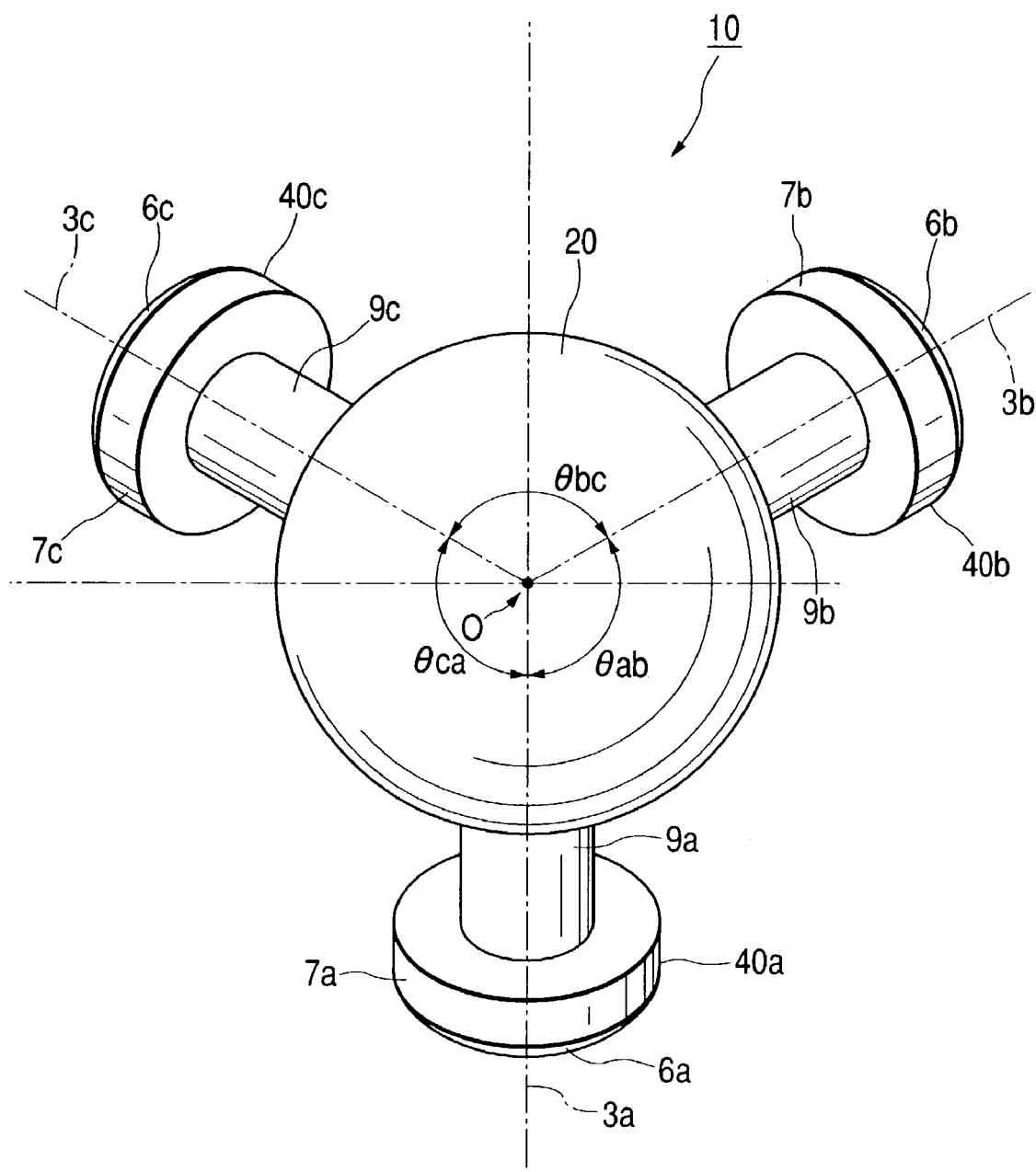
FIG. 17 is a top view of a movable robot according to a second embodiment of this invention.
Figure 18:
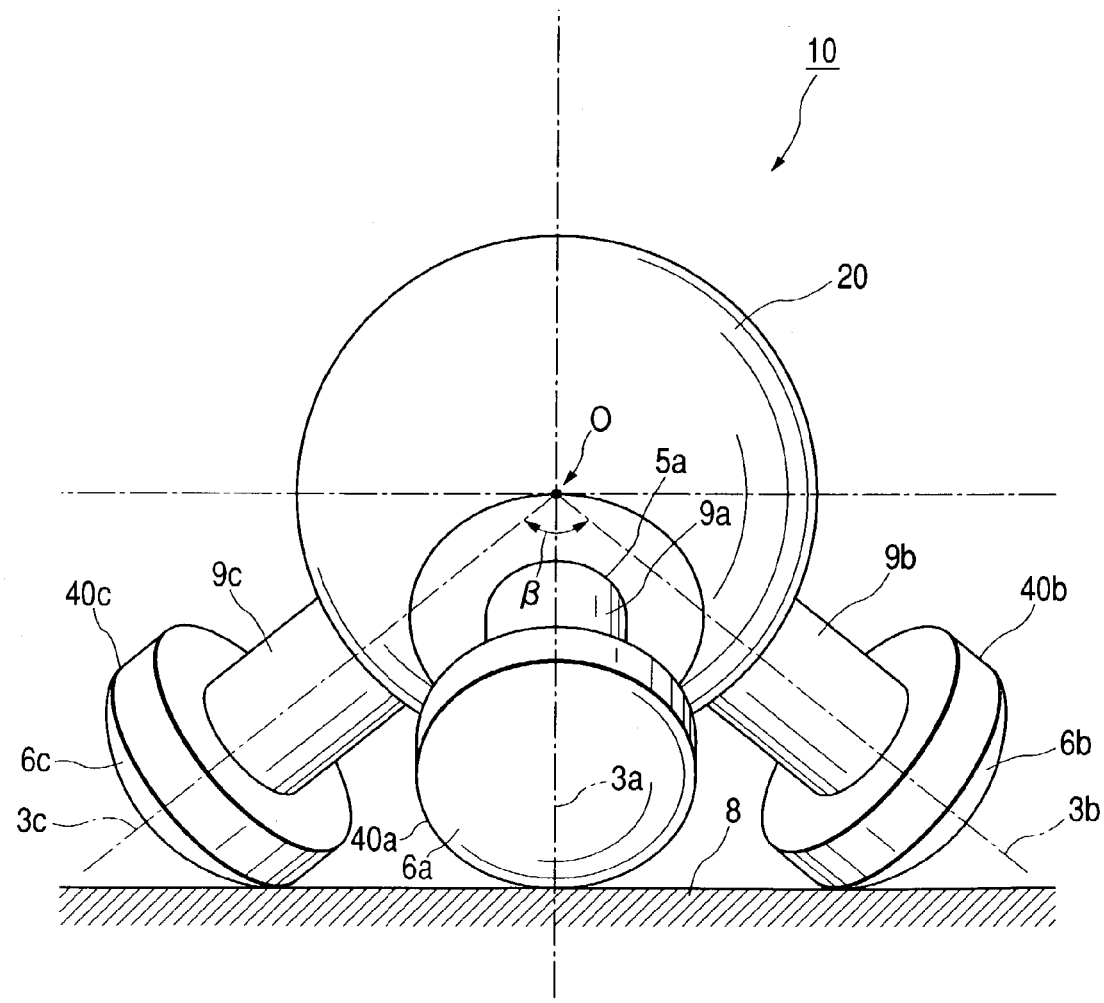
FIG. 18 is a front view of the movable robot in FIG. 17.
Figure 19:
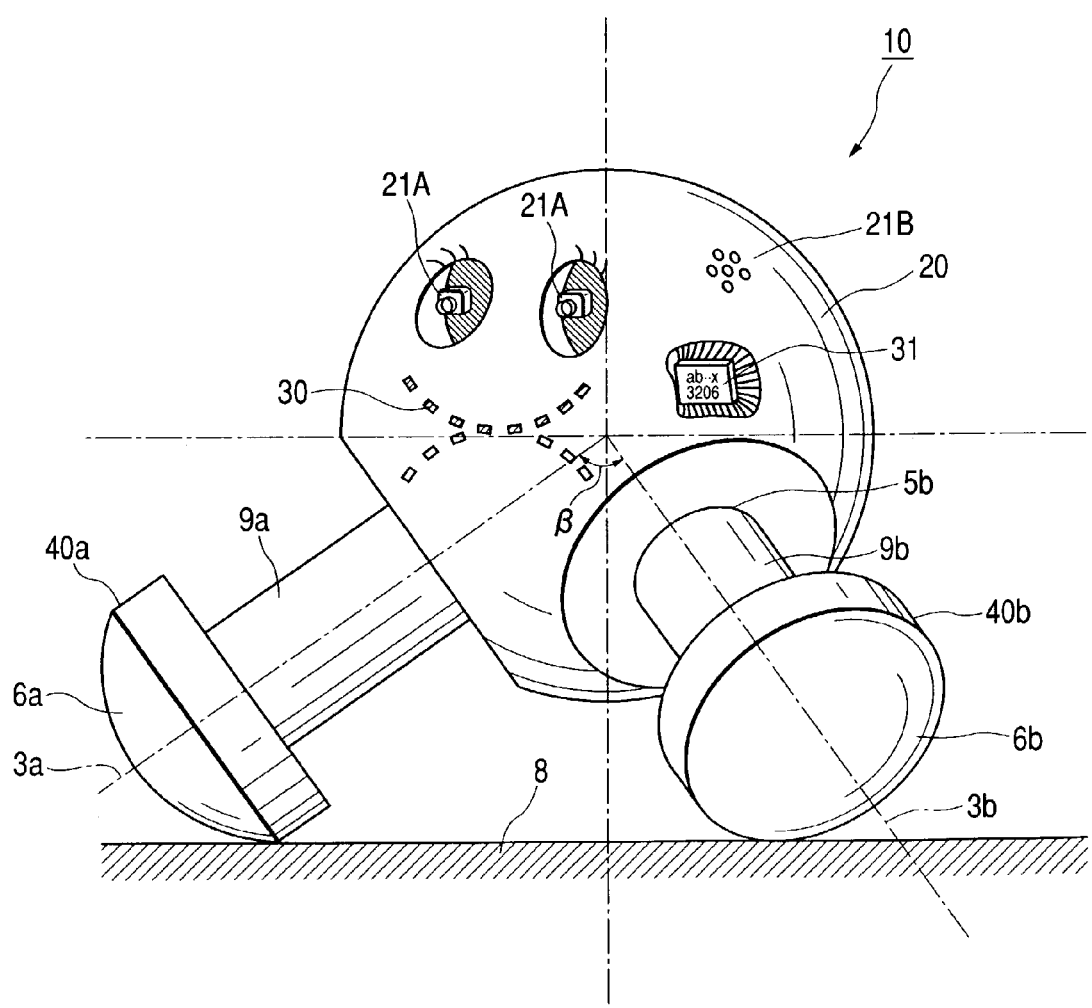
FIG. 19 is a right-hand side view of the movable robot in FIG. 17.

FIGS. 17, 18, and 19 show a movable robot 10 according to a second embodiment of this invention. The movable robot 10 is similar to the movable robot 1 (see FIGS. 1, 2, and 3) except for design changes mentioned later. With reference to FIGS. 17, 18, and 19, the robot 10 includes a main body unit 20 similar to the main body unit 2 (see FIGS. 1, 2, and 3). The robot 10 includes three wheel units 40a, 40b, and 40c which replace the wheel units 4a, 4b, and 4c (see FIGS. 1, 2, and 3) respectively. The wheel units 40a, 40b, and 40c are of equal structures.

The wheel units 40a, 40b, and 40c can rotate circumferentially and move axially. The wheel unit 40a includes a contact portion 6a at its outer end. The contact portion 6a is also referred to as the wheel end 6a. Normally, the wheel end 6a is in contact with a floor surface 8. The wheel unit 40a also includes a cylindrical portion 7a extending coaxially and inward from the contact portion 6a. The wheel unit 40a is connected with the main body unit 20 by a cylindrical leg portion 9a. The leg portion 9a extends coaxially and inward from the cylindrical portion 7a. Thus, the wheel unit 40a is mounted on the outer end of the leg portion 9a. The leg portion 9a extends into the main body unit 20. The leg portion 9a is supported by the main body unit 20. The leg portion 9a can rotate circumferentially. In other words, the leg portion 9a can rotate about a rotation axis 3a. Also, the leg portion 9a can move axially relative to the main body unit 20. As the leg portion 9a moves axially, the wheel unit 40a moves between an innermost position and an outermost position. The innermost position is defined as a normal position. Similarly, the wheel units 40b and 40c include contact portions 6b and 6c, and cylindrical portions 7b and 7c. The wheel units 40b and 40c are connected with the main body unit 20 by leg portions 9b and 9c, respectively. The leg portions 9b and 9c are similar to the leg portion 9a. As the leg portion 9b moves axially, the wheel unit 40b moves between an innermost position (a normal position) and an outermost position. As the leg portion 9c moves axially, the wheel unit 40c moves between an innermost position (a normal position) and an outermost position. The wheel units 40a, 40b, and 40c can be moved independently. In FIGS. 17, 18, and 19, the wheel units 40a, 40b, and 40c are in their outermost positions. The normal positions (innermost positions) of the wheel units 40a, 40b, and 40c are similar to the positions of the wheel units 4a, 4b, and 4c in FIGS. 1, 2, and 3.

A casing in the main body unit 20 is formed with openings 5a, 5b, and 5c which correspond to rotation axes 3a, 3b, and 3c respectively. The leg portions 9a, 9b, and 9c extend through the openings 5a, 5b, and 5c, respectively. The axes of the leg portions 9a, 9b, and 9c coincide with the rotation axes 3a, 3b, and 3c, respectively. When the wheel units 40a, 40b, and 40c are in their normal positions (innermost positions), portions of the wheel units 40a, 40b, and 40c are accommodated in the openings 5a, 5b, and 5c respectively.

Figure 20:
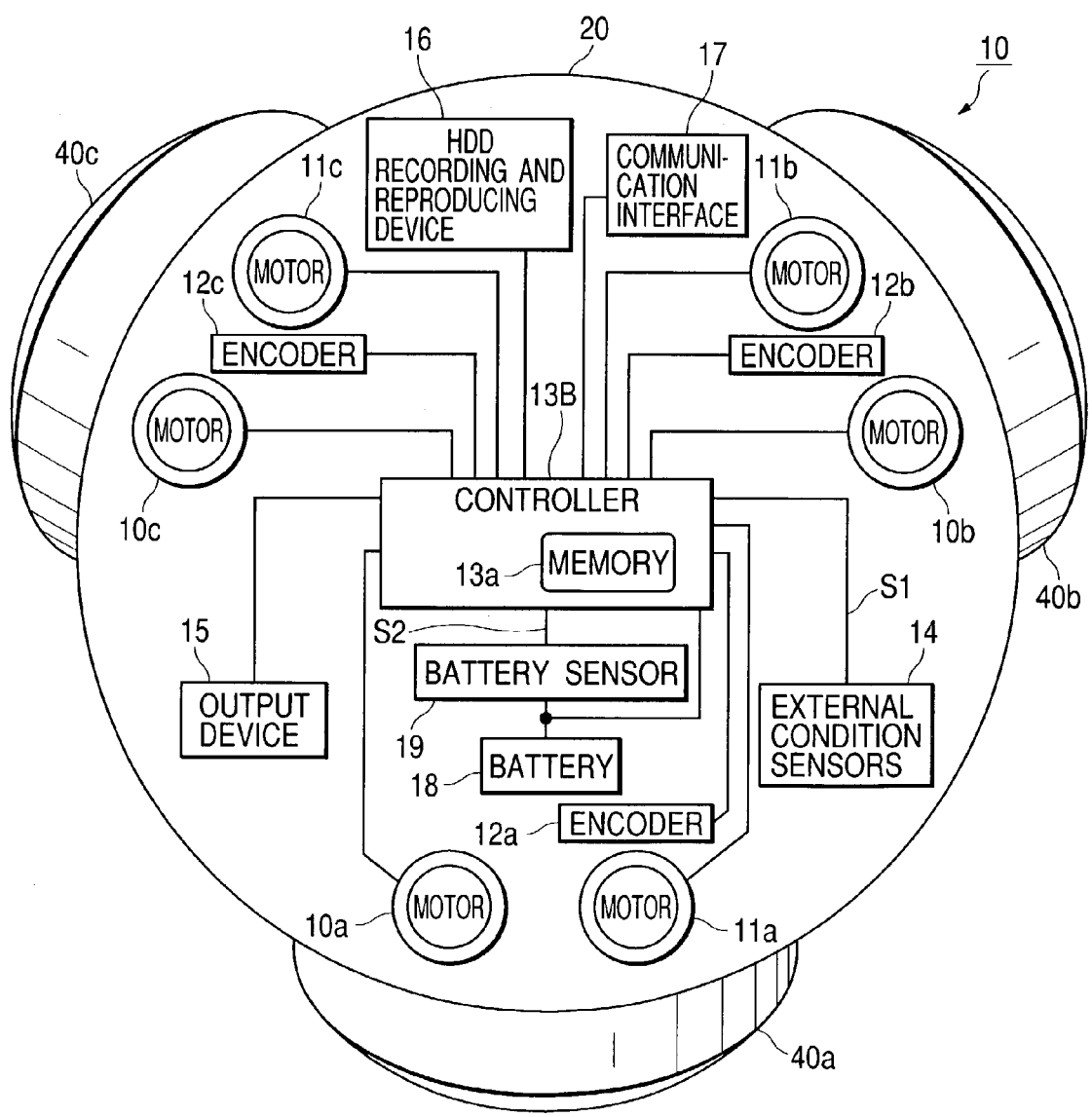
FIG. 20 is a diagram of a control system in the movable robot of FIG. 17.

As shown in FIG. 20, the main body unit 20 contains rotation drive motors 10a, 10b, and 10c. The leg portions 9a, 9b, and 9c are coupled with the output shafts of the rotation drive motors 10a, 10b, and 10c, respectively. The leg portions 9a, 9b, and 9c can be rotated about the rotation axes 3a, 3b, and 3c by the rotation drive motors 10a, 10b, and 10c, respectively. The wheel units 40a, 40b, and 40c rotate together with the leg portions 9a, 9b, and 9c, respectively. Thus, the wheel units 40a, 40b, and 40c can be independently actuated by the rotation drive motors 10a, 10b, and 10c. The wheel units 40a, 40b, and 40c rotate about the rotation axes 3a, 3b, and 3c respectively when being actuated by the rotation drive motors 10a, 10b, and 10c. Preferably, the rotation drive motors 10a, 10b, and 10c include DC motors. It should be noted that the rotation drive motors 10a, 10b, and 10c may be provided in the leg portions 9a, 9b, and 9c or the wheel units 40a, 40b, and 40c.

The main body unit 20 further contains linear-movement drive motors 11a, 11b, and 11c. The leg portions 9a, 9b, and 9c are coupled with the output shafts of the linear-movement drive motors 11a, 11b, and 11c, respectively. The leg portions 9a, 9b, and 9c can be moved along the rotation axes 3a, 3b, and 3c by the linear-movement drive motors 11a, 11b, and 11c, respectively. The wheel units 40a, 40b, and 40c move axially together with the leg portions 9a, 9b, and 9b, respectively. Thus, the wheel units 40a, 40b, and 40c can be independently actuated by the linear-movement drive motors 11a, 11b, and 11c. The wheel units 40a, 40b, and 40c move along the rotation axes 3a, 3b, and 3c respectively when being actuated by the linear-movement drive motors 11a, 11b, and 11c. It should be noted that the linear-movement drive motors 11a, 11b, and 11c may be provided in the leg portions 9a, 9b, and 9c or the wheel units 40a, 40b, and 40c.

Each of the linear-movement drive motors 11a, 11b, and 11c may include a rotary motor having a rotary output shaft, a pinion mounted on the motor shaft, and a rack meshing with the pinion and mounted on the leg portion 9a, 9b, or 9c.

The main body unit 20 also contains encoders 12a, 12b, and 12c for detecting the axial positions of the leg portions 9a, 9b, and 9c, respectively. The axial positions of the leg portions 9a, 9b, and 9c can be subjected to servo control or feedback control responsive to the output signals from the encoders 12a, 12b, and 12c, respectively. It should be noted that the encoders 12a, 12b, and 12c may be provided in the leg portions 9a, 9b, and 9c or the wheel units 40a, 40b, and 40c.

Figure 21:
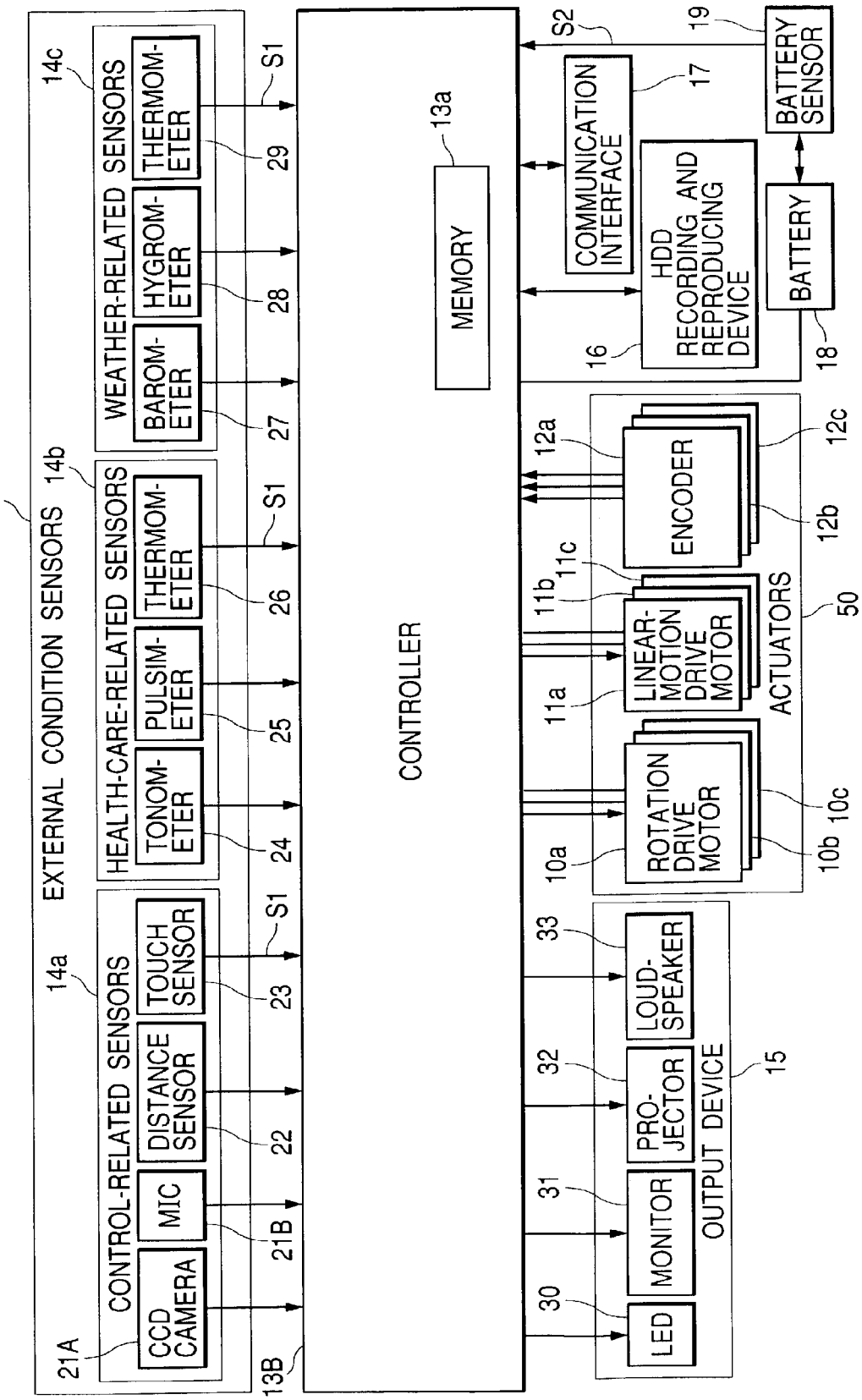
FIG. 21 is a block diagram of the control system in the movable robot of FIG. 17.

FIG. 21 shows a control system in the robot 10. In the control system of FIG. 21, the rotation drive motor 10a, the linear-movement drive motor 11a, and the encoder 12a compose a first sub unit connected with the wheel unit 40a. The rotation drive motor 10b, the linear-movement drive motor 11b, and the encoder 12b compose a second sub unit connected with the wheel unit 40b. The rotation drive motor 10c, the linear-movement drive motor 11c, and the encoder 12c compose a third sub unit connected with the wheel unit 40c. The first, second, and third sub units are referred to as actuators 50.

The wheel units 40a, 40b, and 40c can be rotated by the rotation drive motors 10a, 10b, and 10c even when they are out of the normal positions (innermost positions). The directions and speeds of rotation of the wheel units 40a, 40b, and 40c are independently controlled so that the robot 10 can make the previously-mentioned movements 1), 2), 3), 4), and 5).

As the wheel units 40a, 40b, and 40c are moved from their innermost positions toward their outermost positions, the points at which the wheel ends 6a, 6b, and 6c contact the floor surface 8 are more distant from each other so that the posture of the robot 10 is stabler. In the case where the posture of the robot 10 is sufficiently stable, the robot 10 can move over a small step on the floor surface 8. In the case where the wheel units 40a, 40b, and 40c are in their outermost positions, the robot 10 can move over a small obstacle on the floor surface 8 or a small recess therein.

A ball can be moved by at least one of the wheel units 40a, 40b, and 40c as the wheel unit is moved toward its outermost position at a high speed. A ball can be moved by the robot 10 while being held between two of the leg portions 9a, 9b, and 9c. Accordingly, the robot 10 can make entertaining movements with balls.

Preferably, the axial positions of the leg portions 9a, 9b, and 9c are equal. Alternatively, the axial positions of the leg portions 9a, 9b, and 9c may be different. For example, the axial positions of the leg portions 9a, 9b, and 9c are set so that one of the wheel units 40a, 40b, and 40c will be in its innermost position and the other wheel units will be in their outermost positions or that one of the wheel units 40a, 40b, and 40c will be in its outermost position and the other wheel units will be in their innermost positions. The robot 10 may be moved while the leg portions 9a, 9b, and 9c are being axially moved. Two or more different movements of the robot 10 may be combined to get a more complicated movement.

The robot 10 can quickly move. The robot 10 has performances suited for home use. Two or more different movements of the robot 10 may be combined. Thus, the robot 10 can make entertaining movements. In the case where the wheel units 40a, 40b, and 40c are held stationary or stopped, the robot 10 maintains a same posture. In this case, the robot 10 is prevented from spontaneously moving down even when it is on a sloping floor.

The contact portions 6a, 6b, and 6c of the wheel units 40a, 40b, and 40c may be different in diameters of cross sections perpendicular to the rotation axes 3a, 3b, and 3c. In this case, the robot movements 1), 2), 3), 4), and 5) can be made provided that the ratio among the speeds of rotation of the wheel units 40a, 40b, and 40c is set according to the ratio among the diameters of the contact portions (the wheel ends) 6a, 6b, and 6c. Normally, the greatest-diameter portions of the wheel ends 6a, 6b, and 6c contact the floor surface 8. In the case where the ratio among the greatest diameters of the wheel ends 6a, 6b, and 6c is Ma:Mb:Mc, the ratio among the speeds of rotation of the wheel units 40a, 40b, and 40c is set as 1/Ma:1/Mb:1/Mc.

With reference back to FIGS. 20 and 21, the main body unit 20 contains the actuators 50. The main body unit 20 further includes a controller 13B, external condition sensors 14, an output device 15, a recording and reproducing device 16, a communication interface 17, a battery 18, and a battery sensor 19. The controller 13B is connected with the rotation drive motors 10a, 10b, and 10c, the linear-movement drive motors 11a, 11b, and 11c, the encoders 12a, 12b, and 12c, the external condition sensors 14, the output device 15, the recording and reproducing device 16, the communication interface 17, the battery 18, and the battery sensor 19. The controller 13B is designed to implement general control of the robot 10. The controller 13B includes a microcomputer or a similar device having a combination of an input/output circuit, a processor, a ROM, and a RAM. The controller 13B operates in accordance with a control program stored in the ROM or the RAM. The control program for the controller 13B is designed to enable the controller 13B to execute operation steps for general control of the robot 10. The external condition sensors 14 detect conditions outside the robot 10. The output device 15 transmits information from the controller 13B to an external device. The recording and reproducing device 16 serves to record and reproduce information. The recording and reproducing device 16 includes, for example, a hard disk drive (HDD). The communication interface 17 serves to implement radio communications between the controller 13B and an external device. The battery 18 constitutes a power source of the robot 10. The battery sensor 19 detects the amount of charges remaining in the battery 18.

The external condition sensors 14 are separated into a group of control-related sensors 14a, a group of health-care-related sensors 14b, and a group of weather-related sensors 14c. The control-related sensors 14a get information from outside of the main body unit 20, and detect a pressure applied to the main body unit 20 from an external. The control-related sensors 14a notify the main controller 13B of the information and the applied pressure. The health-care-related sensors 14b measure the health conditions of a user of the robot 10. The health-care-related sensors 14b notify the controller 13B of the measured health conditions. The weather-related sensors 14c measure the weather conditions (for example, the temperature and humidity) of the surroundings of the robot 10. The weather-related sensors 14c notify the controller 13B of the measured weather conditions. The control program for the controller 13B has a segment for making a weather forecast in response to the measured weather conditions.

Specifically, the control-related sensors 14a include a CCD camera 21A, a microphone 21B, a distance sensor 22, and a touch sensor 23. The CCD camera 21A functions as an eye of the robot 10. There may be a plurality of CCD cameras 21A. The microphone 21B functions as an ear of the robot 10. There may be a plurality of microphones 21B. The distance sensor 22 acts to measure the distance between the robot 10 and an obstacle outside the robot 10. The touch sensor 23 detects that the robot 10 is stroked or struck.

The CCD camera 21A takes an image of the surroundings of the robot 10. The CCD camera 21A notifies the controller 13B of the taken image. The microphone 21B picks up user's voices to get voice information. The microphone 21B sends the voice information to the controller 13B. As previously mentioned, the distance sensor 22 measures the distance between the robot 10 and an external obstacle. The distance sensor 22 notifies the controller 13B of the measured distance. The touch sensor 23 measures a pressure applied to the robot 10 which is caused when the user strokes or strikes the robot 10. The touch sensor 23 gets pressure information from the measured pressure. The touch sensor 23 sends the pressure information to the controller 13B.

The health-care-related sensors 14b include a tonometer 24, a pulsimeter (a heartbeat meter) 25, and a thermometer 26. The tonometer 24 measures the blood pressure in the body of the user from, for example, user's finger to get blood-pressure information. The tonometer 24 sends the blood-pressure information to the controller 13B. The pulsimeter 24 measures the pulse frequency in the body of the user to get pulse-frequency information. The pulsimeter 24 sends the pulse-frequency information to the controller 13B. The thermometer 26 measures the bodily temperature in the user to get bodily-temperature information. The thermometer 26 sends the bodily-temperature information to the controller 13B.

The weather-related sensors 14c measure the atmospheric temperature, the humidity, and the atmospheric pressure in the surroundings of the robot 10. The weather-related sensors 14c include a barometer 27, a hygrometer 28, and a thermometer 29. The barometer 27 measures the atmospheric pressure in the surroundings of the robot 10 to get atmospheric-pressure information. The barometer 27 sends the atmospheric-pressure information to the controller 13B. The hygrometer 28 measures the humidity in the surroundings of the robot 10 to get humidity information. The hygrometer 28 sends the humidity information to the controller 13B. The thermometer 29 measures the atmospheric temperature in the surroundings of the robot 10 to get atmospheric-temperature information. The thermometer 29 sends the atmospheric-temperature information to the controller 13B.

The external condition sensors 14 use inexpensive general ones. The external condition sensors 14 measure and detect the conditions of the surroundings of the robot 10, the health-related conditions of the body of the user, and the weather conditions. The external condition sensors 14 generate detection information representing the measured and detected conditions. The external condition sensors 14 send the detection information to the controller 13B as sensor signals S1.

As previously mentioned, the battery sensor 19 detects the amount of charges remaining in the battery 18. The battery sensor 19 generates information representing the result of the detection. The battery sensor 19 sends the detection-result information to the controller 13B as a battery detection signal S2.

The controller 13B includes a memory 13a storing the control program. The controller 13B decides the conditions of the surroundings of the robot 10, the amount of charges remaining in the battery 18, commands from the user, and the presence and absence of an action of the user on the robot 10 in response to the sensor signals S1 and the battery detection signal S2. According to the control program, the controller 13B determines a desired movement of the robot 10 in response to the results of the above-mentioned decision. The controller 13B operates the rotation drive motors 10a, 10b, and 10c, and the linear-movement drive motors 11a, 11b, and 11c in accordance with the desired movement so that the robot 10 will actually make a movement equal to the desired one.

The output device 15 includes LEDs 30, a monitor 31, a projector 32, and a loudspeaker 33. Preferably, the LEDs 30 are different-color light emitters. The LEDs 30 include at least red one and green one. The monitor 31 and the projector 32 are displays. The controller 13B can instruct the output device 15 to output prescribed information. For example, the controller 13B can instruct the LEDs 30 to continuously turn on or periodically turn on and off to indicate given information. Also, the controller 13B can instruct the monitor 31 and the projector 32 to indicate prescribed picture information. Furthermore, the controller 13B can instruct the loudspeaker 33 to generate various types of sound information. The control of the output device 15 by the controller 13B enables the robot 10 to show its feelings on a personification basis.

Information outputted from the output device 15 includes video information and audio information. Furthermore, the information outputted from the output device 15 includes video information generated by the external condition sensors 14, information generated by the external condition sensors 14 which represents the blood pressure, the pulse frequency, the humidity, and the atmospheric temperature, information received from outside of the robot 10 via the communication interface 17, and information reproduced by the recording and reproducing device 16.

As understood from the previous description, the controller 13 enables the robot 10 to autonomously operate in response to external information, commands from the user, and the presence and absence of an action of the user on the robot 10.

The controller 13B can instruct the monitor 31 to indicate the conditions (for example, the atmospheric temperature and the humidity) measured by the weather-related sensors 14c. The controller 13B determines the degree of comfortableness in response to the conditions measured by the weather-related sensors 14c. The controller 13 can instruct the output device 15 to show robot's feelings in accordance with the determined degree of comfortableness. For example, the controller 13B determines the degree of comfortableness in response to the atmospheric temperature and the humidity measured by the weather-related sensors 14c. Then, the controller 13B decides whether the determined degree of comfortableness is in an acceptable range or an unacceptable range. When the degree of comfortableness is in the unacceptable range, the controller 13B instructs the red LED 30 to periodically turn on and off. On the other hand, when the degree of comfortableness is in the acceptable range, the controller 13B instructs the green LED 30 to continuously turn on.

The controller 13B continuously monitors the atmospheric pressure measured by the barometer 27 in the weather-related sensors 14c, and detects a variation in the atmospheric pressure. The controller 13B makes a weather forecast in response to the detected variation in the atmospheric pressure. The controller 13B selects one among the LEDs 30 which emits light having color corresponding to the contents of the weather forecast. The controller 13B activates the selected LED 30. Alternatively, the controller 13B may instruct the monitor 31 to indicate the contents of the weather forecast. The controller 13B may instruct the loudspeaker 33 to audibly report the contents of the weather forecast to the user.

The controller 13B detects from the output signal of the touch sensor 23 in the control-related sensors 14a that the robot 10 is stroked by the user. When it is detected that the robot 10 is stroked, the controller 13B instructs the green LED 30 to turn on and simultaneously operates the rotation drive motors 10a, 10b, and 10c to rotate the robot 10 on its own axis to show robot's feeling of joy. In this case, the controller 13B may also activate the monitor 31, the projector 32, and the loudspeaker 33 to generate visual information and audible information. The controller 13B detects from the output signal of the touch sensor 23 in the control-related sensors 14a that the robot 10 is struck by the user. When it is detected that the robot 10 is struck, the controller 13B instructs the red LED 30 to periodically turn on and off and simultaneously operates the rotation drive motors 10a, 10b, and 10c to rotate the robot 10 on its own axis alternately in the normal direction and the reverse direction to show robot's feeling of anger. In this case, the controller 13B may also activate the monitor 31, the projector 32, and the loudspeaker 33 to generate visual information and audible information.

Preferably, the cameras 21A, the microphones 21B, the monitor 31, and the LEDs 30 are mounted on the outer surfaces of the main body unit 20 as shown in FIG. 19. The cameras 21A are arranged to form eyes of the robot 10. The microphones 21B are arranged to form ears of the robot 10. The monitor 31 is located at a place corresponding to a cheek of the robot 10. The LEDs 30 are arranged to form a mouth of the robot 10. The LEDs 30 in FIG. 19 are in an arcuate array having raised ends and an arcuate array having lowered ends. To show robot's feeling of joy, the controller 13B may activate only the LEDs 30 in the arcuate array having the raised ends. To show robot's feeling of sorrow or anger, the controller 13B may activate only the LEDs 30 in the arcuate array having the lowered ends. To show robot's feeling of excitement, the controller 13B may instruct the monitor 31 to indicate a red picture. To show robot's feeling of unease, the controller 13B may instruct the monitor 31 to indicate a blue picture.

As understood from the previous description, the robot 10 can autonomously operate. In addition, the robot 10 can show its feelings on a personification basis. Thus, the user and the robot 10 can closely communicate with each other. The robot 10 can act as user's partner capable of giving pleasure and joy to the user.

The controller 13B can instruct the communication interface 17 to transmit, to an external, information represented by the sensor signals S1 and information stored in the recording and reproducing device 16. The communication interface 17 can receive user's commands. The controller 13B can receive the user's commands from the communication interface 17. The controller 13B adjusts the rotation drive motors 10a, 10b, and 10c, and the linear-movement drive motors 11a, 11b, and 11c in response to the user's commands to operate the robot 10 on a non-autonomous basis. In this case, the robot 10 is under remote control.

Preferably, a remote controller unit located outside the robot 10 or a personal computer located outside the robot 10 and having a radio communication unit sends a radio signal representative of user's command toward the robot 10. The communication interface 17 in the robot 10 receives the radio signal, and extracts the user's command therefrom. The communication interface 17 feeds the user's command to the controller 13B. The controller 13B operates the robot 10 in accordance with the user's command.

A personal computer or a mobile telephone device located outside the robot 10 can send information from its internal memory toward the robot 10. The communication interface 17 in the robot 10 receives the sent information. The communication interface 17 feeds the received information to the controller 13B. The controller 13B instructs the output device 15 to visually or audibly indicate the received information. In this case, the robot 10 is under remote control.

As previously mentioned, the control-related sensors 14a generate video information and audio information. The controller 13B can transfer the video information and the audio information from the control-related sensors 14a to the communication interface 17. The controller 13B instructs the communication interface 17 to transmit the video information and the audio information to a remote site. In this case, the robot 10 can be used as a monitor camera with a microphone. Communications between the robot 10 and the remote side are of a two-way type. In this case, a person in the remote site can operate the robot 10 on a remote-control basis while monitoring images taken by the robot 10.

As previously mentioned, the health-care-related sensors 14b generate body-condition information representing the blood pressure, the pulse frequency, and the temperature in the body of the user. The controller 13B can transfer the body-condition information from the health-care-related sensors 14b to the communication interface 17 at regular intervals. The controller 13B instructs the communication interface 17 to regularly transmit the body-condition information to a remote side such as a hospital or a heal care center. In this case, the health conditions of the user of the robot 10 can be managed at the remote site. When communications between the robot 10 and the remote site are of the two-way type, a doctor in the remote side can inquire of the robot user about user's physical conditions.

Information representing normal ranges of the blood pressure, the pulse frequency, and the bodily temperature may be previously stored in the memory 13a. In this case, the control program for the controller 13B has a step of comparing the measured blood pressure, the measured pulse frequency, and the measured bodily temperature with the normal ranges, a step of deciding whether or not the user is sick on the basis of the results of the comparison, and a step of notifying a hospital via the communication interface 17 when the user is decided to be sick.

The recording and reproducing device 16 may use one different from the HDD. Preferably, the recording and reproducing device 16 is used in recording information received via the communication interface 17 and reproducing the recorded information. The recording and reproducing device 16 may make up for the capacity of the memory 13a. The recording and reproducing device 16 may be used in recording information generated by the external condition sensors 14 and reproducing the recorded information.

Generally, the control program for the controller 13B is relatively simple. Therefore, a relatively small capacity of the memory 13a suffices. Also, a relatively small capacity of the recording and reproducing device 16 suffices. As previously mentioned, the external condition sensors 14 use inexpensive general ones.

Third Embodiment

A third embodiment of this invention is similar to the first embodiment or the second embodiment thereof except for the following design change. In the third embodiment of this invention, rotation axes 3a, 3b, and 3c intersect at a point which is separate from the center O of the approximately spherical casing of the main body unit 2 or 20, and which is on a vertical line V passing through the center O and being perpendicular to the floor surface 8 (see FIG. 2). Preferably, the angles between the rotation axes 3a, 3b, and 3c are substantially equal.

Fourth Embodiment

A fourth embodiment of this invention is similar to one of the first to third embodiments thereof except for the following design change. In the fourth embodiment of this invention, a robot has four or more wheel units extending coaxially with rotation axes respectively.

Fifth Embodiment

A fifth embodiment of this invention is similar to one of the first to fourth embodiments thereof except for the following design change. In the fifth embodiment of this invention, rotation axes do not intersect regardless of its number. Preferably, lines projected onto the movement plane (the floor surface 8) and originating from the rotation axes are spaced at substantially equal angular intervals.

Sixth Embodiment

A sixth embodiment of this invention is similar to the first embodiment or the second embodiment thereof except for the following design change. In the sixth embodiment of this invention, all of rotation axes 3a, 3b, and 3c are not on a common plane, and at most two among the rotation axes 3a, 3b, and 3c are on a common plane. The main body unit 2 or 20 can be sufficiently separated from the movement plane (the floor surface 8) without significantly increasing the diameter of the wheel units. Therefore, the robot 1 or 10 can easily move over an obstacle on the floor surface 8.

Seventh Embodiment

A seventh embodiment of this invention is similar to the first embodiment or the second embodiment thereof except for the following design change. In the seventh embodiment of this invention, the contact portions 6a, 6b, and 6c of the wheel units have a shape different from the partial sphere. For example, the shape of the contact portions 6a, 6b, and 6c is of a ridgeline type defined by a cylinder.

Eighth Embodiment

Figure 22:
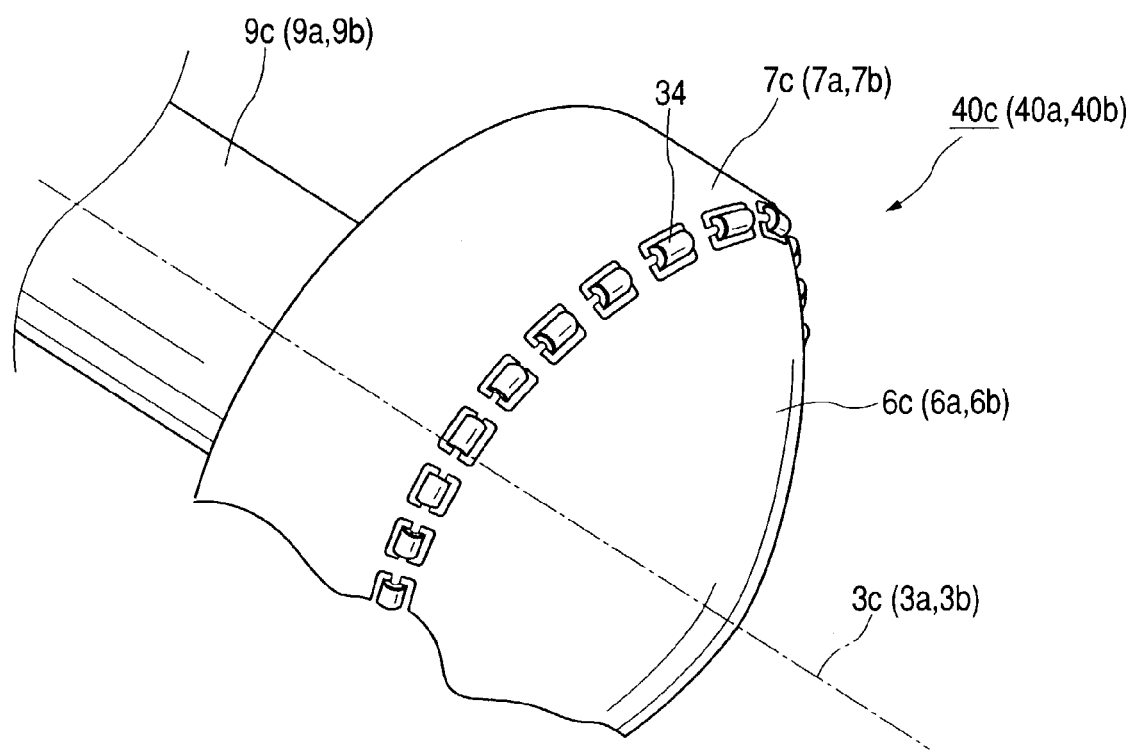
FIG. 22 is a perspective view of a wheel unit and a leg portion in an eighth embodiment of this invention.

An eighth embodiment of this invention is similar to the second embodiment thereof except for the following design change. FIG. 22 shows a portion of the eighth embodiment of this invention. As shown in FIG. 22, each of the wheel units 40a, 40b, and 40c has small rollers 34 arranged at equal intervals along the circle of an outer edge of the wheel end 6a, 6b, or 6c for contact with the floor surface. The axes of the rollers 34 extend in tangential directions with respect to the above-indicated circle.

During operation of the robot 10 in the mode 2A which corresponds to the straight movement, the lowermost roller or rollers 34 on the deactivated wheel unit rotate about their own axes and hence help the deactivated wheel unit slide on the floor surface 8. On the other hand, the rollers 34 on the activated wheel units (the rotated wheel units) receive axial-direction forces and hence do not rotate about their own axes. Accordingly, the rollers 34 on the activated wheel units cause sufficient friction between the activated wheel units and the floor surface 8, thereby allowing the application of an adequate thrust to the robot 10. Thus, the robot 10 can smoothly move straight.

Ninth Embodiment

A ninth embodiment of this invention is similar to the first embodiment thereof except for the following design change. In the ninth embodiment of this invention, each of the wheel units 4a, 4b, and 4c has small rollers as the wheel unit in the eighth embodiment does.

Tenth Embodiment

A tenth embodiment of this invention is similar to the first embodiment or the second embodiment thereof except for the following design change. In the tenth embodiment of this invention, the main body unit 2 or 20 has a shape different from the approximately spherical shape. All of the rotation axes 3a, 3b, and 3c are not on a common plane. Lines projected onto the movement plane (the floor surface 8) and originating from the rotation axes 3a, 3b, and 3c are spaced at substantially equal angular intervals.

Figure 23:
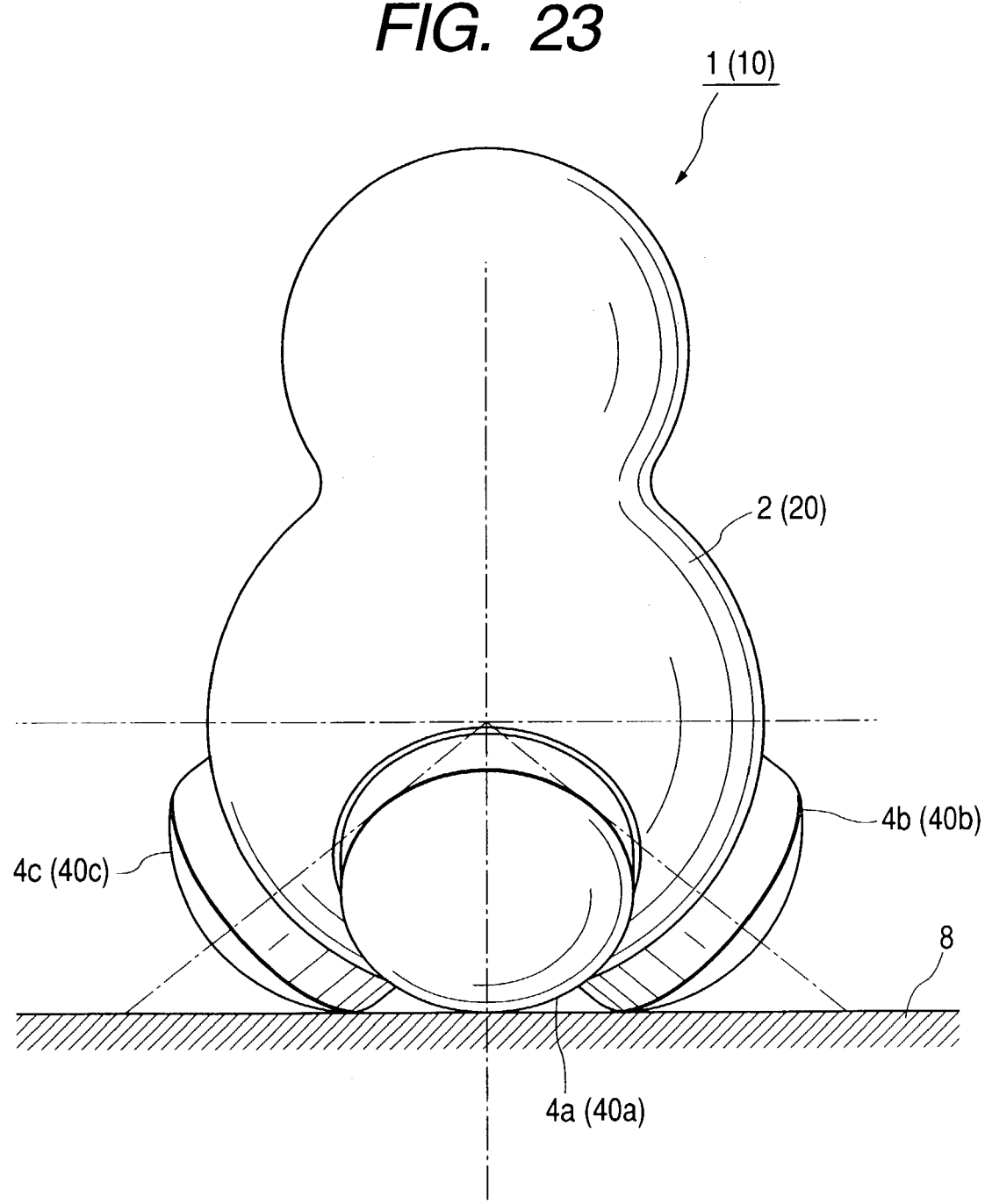
FIG. 23 is a front view of a movable robot according to a tenth embodiment of this invention.

For example, the main body unit 2 or 20 has a capsule-like shape or an approximately cylindrical shape. The main body unit 2 or 20 may have a potbellied shape as shown in FIG. 23. The main body unit 2 or 20 may have a polygonal shape. The shape of the main body unit 2 or 20 may be symmetrical or non-symmetrical.

Preferably, the center of gravity of the robot 1 or 10 is on a vertical line having a point at which the rotation axes 3a, 3b, and 3c intersect. Here, the vertical line means a line perpendicular to the floor surface 8.

Eleventh Embodiment

An eleventh embodiment of this invention is similar to the first embodiment or the second embodiment thereof except for the following design change. The health-care-related sensors 14b or the weather-related sensors 14c are omitted from the eleventh embodiment of this invention. The robot 1 or 10 in the eleventh embodiment of this invention is designed exclusively for health care or weather forecasts.

Twelfth Embodiment

A twelfth embodiment of this invention is similar to the first embodiment or the second embodiment thereof except for the following design change. At least one among the sensors in the control-related sensors 14a, the health-care-related sensors 14b, and the weather-related sensors 14c is omitted from the twelfth embodiment of this invention.

Thirteenth Embodiment

A thirteenth embodiment of this invention is similar to the first embodiment thereof except for the following design changes. According to the thirteenth embodiment of this invention, the robot 1 has a control system similar to that in FIG. 21. The linear-movement motors 11a, 11b, and 11c, and the encoders 12a, 12b, and 12c are omitted from the control system in the thirteenth embodiment of this invention.

ADVANTAGES PROVIDED BY THE INVENTION

The rotation drive motors placed in the main body unit or the wheel units can independently rotate the wheel units. Lines projected onto the movement plane (the floor surface) and originating from the axes of rotation of the wheel units are spaced at substantially equal angular intervals. Thus, a driving structure in the robot can be relatively simple. The number of parts composing the robot can be relatively small. The wheel units can use ones having a same structure. Therefore, the robot can be relatively inexpensive, and relatively small in size. The robot is suited for home use.

The robot hardly falls down. The robot has only a very small chance of falling down when accidentally meeting an obstacle. Thus, the robot is safe to a user.

Although the main body unit is spherical, the robot can easily maintain its posture or easily move in a desired way even when it is on a sloping floor. When the wheel units keep stopped, the robot is prevented from spontaneously moving down along a sloping floor.

The robot can freely make a forward movement, a backward movement, a meandering movement, and a rotation on its own axis with the robot center remaining at a same point. In addition, the robot can make a more complicated movement. Thus, the robot has excellent performances.

All the rotation axes of the wheel units are not on a common plane. Thus, the main body unit can be sufficiently spaced from the movement plane (the floor surface) without significantly increasing the size of the wheel units. Accordingly, the robot can move over an obstacle on the floor surface.

All the rotation axes of the wheel units intersect at a point, and all the wheel units are in equal conditions of contact with the floor surface. Therefore, the wheel units can be held in stabler contact states.

The main body unit and the wheel units are connected by the axially-movable leg portions. The linear-movement drive motors for axial movements of the leg portions are placed in the main body unit, the wheel units, or the leg portions. Thus, the robot can move over a small step on the floor surface without falling down. The robot can move while the leg portions are moving axially. Therefore, the robot can make entertaining movements.

Each of the contact portions of the wheel units has a convex surface extending along a part of a sphere. Thus, only narrow areas on the contact portions of the wheel units are in contact with the floor surface. Accordingly, the outer surfaces of the main body unit are prevented from becoming dirty and flawed as a result of long-term use of the robot.

The main body unit is provided with the external condition sensors for detecting the conditions of the surroundings of the robot to get the external condition information, the output device for outputting information to the external with respect to the robot, the memory storing the control program for the signal processing in response to the external condition information generated by the external condition sensors, and the controller for deciding the contents of information to be outputted from the output device and also the contents of control of the rotation drive motors on the basis of the control program and the external condition information generated by the external condition sensors, and for controlling the output device and the rotation drive motors in accordance with the decided contents of information to be outputted from the output device and also the decided contents of control of the rotation drive motors. Thus, the control algorithm in the control program which relates to the autonomous control is relatively simple. It is unnecessary to equip the robot with a special computer. The capacity of the control program is adequately limited. It is sufficient that the memory has a relatively small capacity. Accordingly, the robot is relatively inexpensive. The robot can move the leg portions axially. Thus, the robot can make entertaining movements.

The external condition sensors include the control-related sensors for detecting not only the conditions of the surroundings of the robot but also a pressure applied to the main body unit from outside, the health-core-related sensors for measuring the health conditions of the user, and the weather-related sensors for measuring the weather conditions of the surroundings of the main body unit. The control-related sensors send the detection results to the controller. The health-care-related sensors send the measurement results to the controller. The weather-related sensors send the measurement results to the controller. The health-care-related sensors and the weather-related sensors may be omitted from the robot. The robot can show its feelings on a personification basis in accordance with the conditions of the surroundings thereof. Thus, the robot can smoothly communicate with the user.

The main body unit is provided with the communication interface for radio communications with an external device. Therefore, it is possible to implement communications between the robot and a site remote therefrom. The robot can give pleasure and joy to the user.

What is claimed is:

1. A movable robot comprising:
   a main body unit;
   at least three wheel units having contact portions for contact with a floor surface and at least partially projecting from the main body unit;
   rotation drive devices for rotating the wheel units independently of each other;
   leg portions connecting the main body unit and the wheel units and having axes respectively; and means for moving the main body unit along the floor surface as the wheel units are rotated by the rotation drive devices;

wherein the axes of the leg portions coincide with axes of rotation of the wheel units respectively, and the axes of rotation of the wheel units intersect at a point, and wherein lines projected onto the floor surface and originating from the axes of rotation of the wheel units are spaced at substantially equal angular intervals.

2. A movable robot as recited in claim 1, wherein at most two of the axes of rotation of the wheel units are on a common plane.

3. A movable robot as recited in claim 1, wherein the leg portions are axially movable relative to the main body unit, and further comprising axial-motion drive devices for axially moving the leg portions relative to the main body unit.

4. A movable robot as recited in claim 1, wherein each of the contact portions has a convex surface substantially extending along a part of a sphere.

5. A movable robot comprising:

a main body unit;

at least three wheel units connected with the main body unit and at least partially projecting from the main body unit, the wheel units having contact portions for contact with a floor surface;

rotation drive devices for rotating the wheel units independently of each other;

means for moving the main body unit along the floor surface as the wheel units are rotated by the rotation drive devices;

an external condition sensor for detecting a condition of an external with respect to the main body unit;

an output device for outputting information to the external with respect to the main body unit;

a memory storing a control program for implementing prescribed processing in response to the external condition detected by the external condition sensor; and a controller for deciding contents of information to be outputted from the output device and also contents of control of the rotation drive devices on the basis of the control program and the external condition detected by the external condition sensor, and for controlling the output device and the rotation drive devices in accordance with the decided contents of information to be outputted from the output device and also the decided contents of control of the rotation drive devices;

wherein lines projected onto the floor surface and originating from axes of rotation of the wheel units are spaced at substantially equal angular intervals.

6. A movable robot as recited in claim 5, further comprising:

axially-movable leg portions connecting the main body unit and the wheel units;

axial-motion drive devices for axially moving the leg portions relative to the main body unit; and means provided in the controller for controlling the axial-motion drive devices.

7. A movable robot as recited in claim 5, wherein the external condition sensor comprises a first sub sensor for detecting a specified condition of the external with respect to the main body unit, and a second sub sensor for detecting a pressure applied to the main body unit from the external with respect to the main body unit.

8. A movable robot as recited in claim 5, further comprising a communication device for implementing radio communications between the controller and an external device.

* * * * *